US012695600B2

(12) United States Patent
Masunaga et al.

(10) Patent No.: US 12,695,600 B2
(45) Date of Patent: Jul. 28, 2026

(54) INFORMATION PROCESSING APPARATUS, INFORMATION PROCESSING METHOD, AND RECORDING MEDIUM

(71) Applicant: Sony Semiconductor Solutions Corporation, Atsugi (JP)

(72) Inventors: Shohei Masunaga, Kanagawa (JP); Munetake Ebihara, Kanagawa (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 226 days.

(21) Appl. No.: 18/699,903

(22) PCT Filed: Sep. 13, 2022

(86) PCT No.: PCT/JP2022/034238

§ 371 (c)(1),
(2) Date: Sep. 10, 2024

(87) PCT Pub. No.: WO2023/067952

PCT Pub. Date: Apr. 27, 2023

(65) Prior Publication Data

US 2025/0286702 A1     Sep. 11, 2025

(30) Foreign Application Priority Data

Oct. 22, 2021     (JP) ................................. 2021-173396

(51) Int. Cl.
*H04L 9/08*          (2006.01)
*H04L 9/16*          (2006.01)
(52) U.S. Cl.
CPC .............. *H04L 9/0819* (2013.01); *H04L 9/16* (2013.01)

(58) Field of Classification Search
CPC . H04L 9/08; H04L 9/0819; H04L 9/16; H04L 9/0891; G06F 21/60
See application file for complete search history.

(56) References Cited

U.S. PATENT DOCUMENTS 10,587,776 B2 *     3/2020    Kang ................... H04N 19/126
12,088,694 B2 *     9/2024    Woo .......................... H04L 9/14
                    (Continued)

FOREIGN PATENT DOCUMENTS

JP          2001-036517 A          2/2001
JP          2008-510185 A          4/2008
                    (Continued)

OTHER PUBLICATIONS

International Search Report and Written Opinion mailed on Nov. 22, 2022, received for PCT Application PCT/JP2022/034238, filed on Sep. 13, 2022, 8 pages including English Translation.

*Primary Examiner* — Hosuk Song
(74) *Attorney, Agent, or Firm* — XSENSUS, LLP

(57) ABSTRACT

An information processing apparatus includes an encryption key creation part that creates an encryption key, a second type key different from the first type key, and a third type key that is different from the first type key and the second type key and is a key multiplied with the second type key to create a combination key stored in an imaging apparatus, or is a key stored in the imaging apparatus together with the second type key, as an encryption key used by the imaging apparatus for encryption of artificial intelligence (AI) software including at least software of an artificial intelligence model, the imaging apparatus performing image recognition processing using the artificial intelligence model on a captured image obtained by capturing an image of a subject.

17 Claims, 15 Drawing Sheets 100 (INFORMATION MANAGEMENT SYSTEM)

(56) References Cited

U.S. PATENT DOCUMENTS

| | | | | |
|---|---|---|---|---|
| 12,257,025 B2 * | 3/2025 | Soori-Arachi | ......... | G06Q 50/01 |
| 12,323,509 B2 * | 6/2025 | Yan | ....................... | H04L 9/0825 |
| 12,470,381 B2 * | 11/2025 | Baldwin | ................ | G06N 20/00 |

FOREIGN PATENT DOCUMENTS

| | | | |
|---|---|---|---|
| JP | 2020-053880 A | 4/2020 |
| WO | 2020/255575 A1 | 12/2020 |

* cited by examiner 100 (INFORMATION MANAGEMENT SYSTEM)

Figure 4:
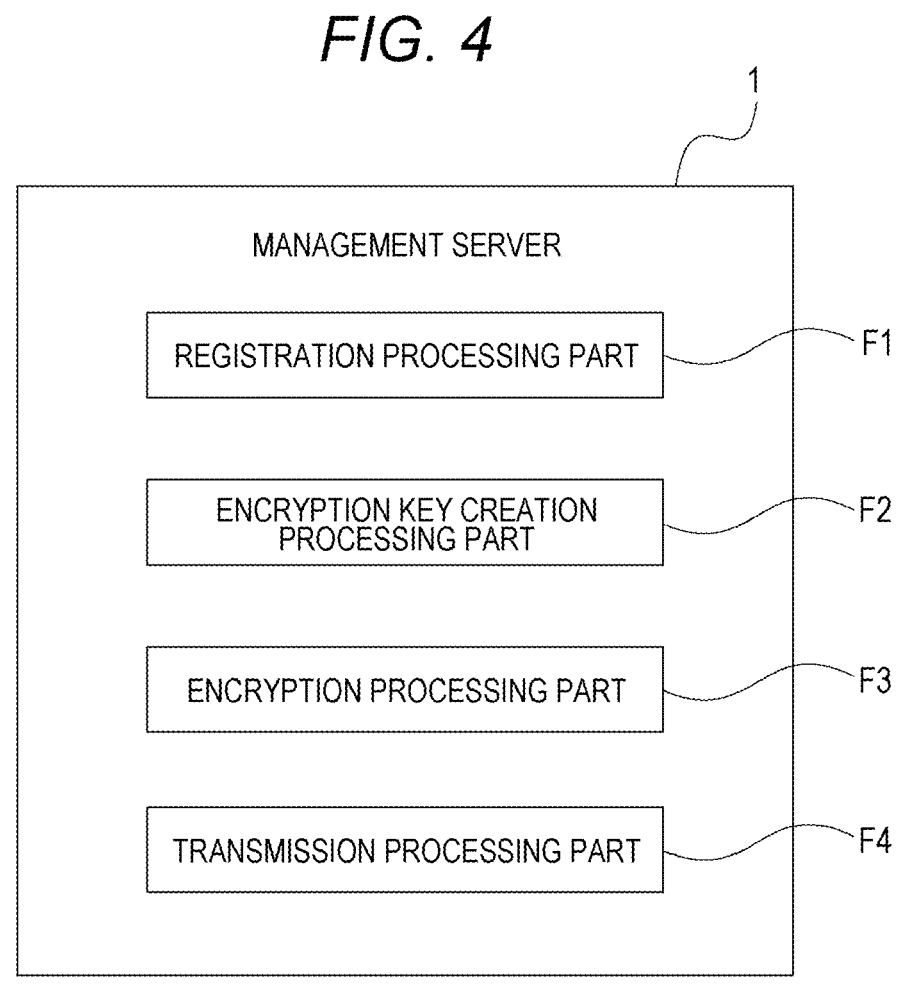

MANAGEMENT SERVER

| REGISTRATION PROCESSING PART | F1 |

| ENCRYPTION KEY CREATION PROCESSING PART | F2 |

| ENCRYPTION PROCESSING PART | F3 |

| TRANSMISSION PROCESSING PART | F4 |

*FIG. 5*

| CUSTOMER ID | CAMERA ID | CHIP ID | MASTER KEY | CUSTOMER MANAGEMENT KEY |
|---|---|---|---|---|
| CS001 | CM001 | CH001 | MK001 | CK001 |
| | CM002 | CH002 | MK001 | |
| | ⋮ | ⋮ | ⋮ | |
| | CM0xx | CH0xx | MKxxx | |
| ⋮ | ⋮ | ⋮ | ⋮ | ⋮ |
| CSxxx | CMx01 | CHx01 | MKx01 | CKxxx |
| | CMx02 | CHx02 | MKx01 | |
| | ⋮ | ⋮ | ⋮ | |
| | CMxxx | CHxxx | MKxxx | |

*FIG. 6*

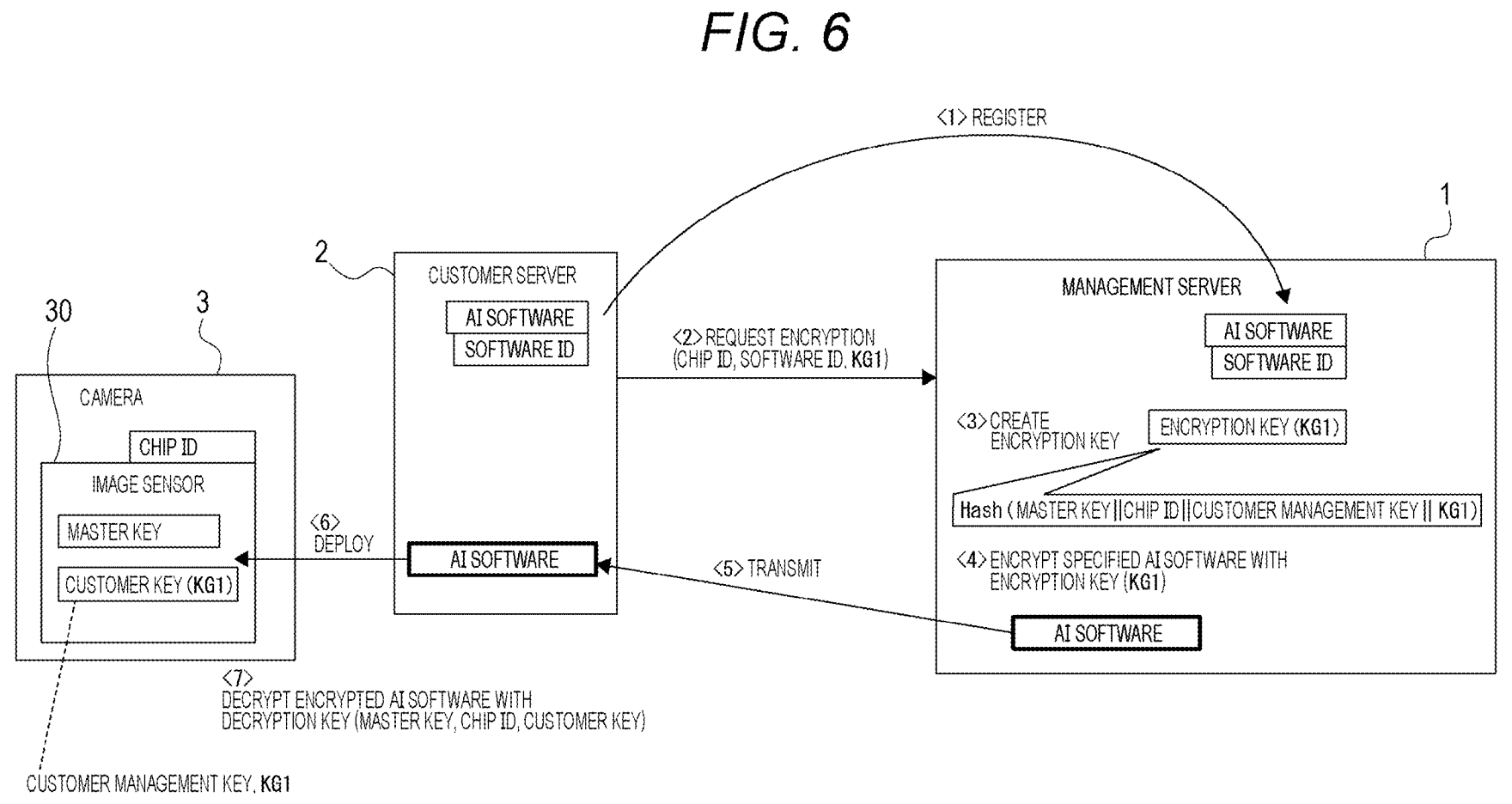

MANAGEMENT SERVER 1

AI SOFTWARE
SOFTWARE ID

<3> CREATE ENCRYPTION KEY

ENCRYPTION KEY (KG1)

Hash (MASTER KEY ‖ CHIP ID ‖ CUSTOMER MANAGEMENT KEY ‖ KG1)

<4> ENCRYPT SPECIFIED AI SOFTWARE WITH ENCRYPTION KEY (KG1)

AI SOFTWARE

<1> REGISTER

<2> REQUEST ENCRYPTION (CHIP ID, SOFTWARE ID, KG1)

<5> TRANSMIT

CUSTOMER SERVER 2

AI SOFTWARE
SOFTWARE ID

AI SOFTWARE

<6> DEPLOY

DECRYPT ENCRYPTED AI SOFTWARE WITH DECRYPTION KEY (MASTER KEY, CHIP ID, CUSTOMER KEY)

<7> DECRYPT ENCRYPTED AI SOFTWARE WITH DECRYPTION KEY, KG1

CAMERA 3

30

CHIP ID

IMAGE SENSOR

MASTER KEY

CUSTOMER KEY (KG1)

CUSTOMER MANAGEMENT KEY, KG1

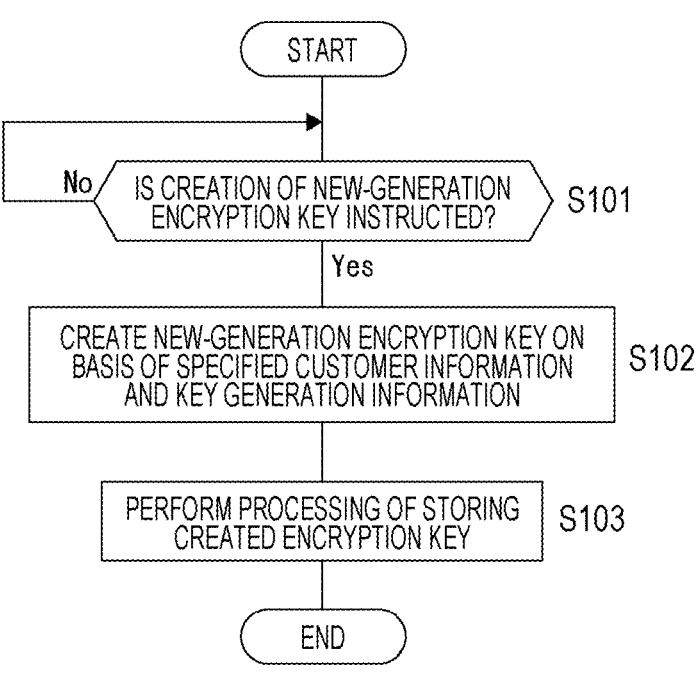

START

No — IS CREATION OF NEW-GENERATION ENCRYPTION KEY INSTRUCTED? — S101

Yes

CREATE NEW-GENERATION ENCRYPTION KEY ON BASIS OF SPECIFIED CUSTOMER INFORMATION AND KEY GENERATION INFORMATION — S102

PERFORM PROCESSING OF STORING CREATED ENCRYPTION KEY — S103

END

FIG. 14

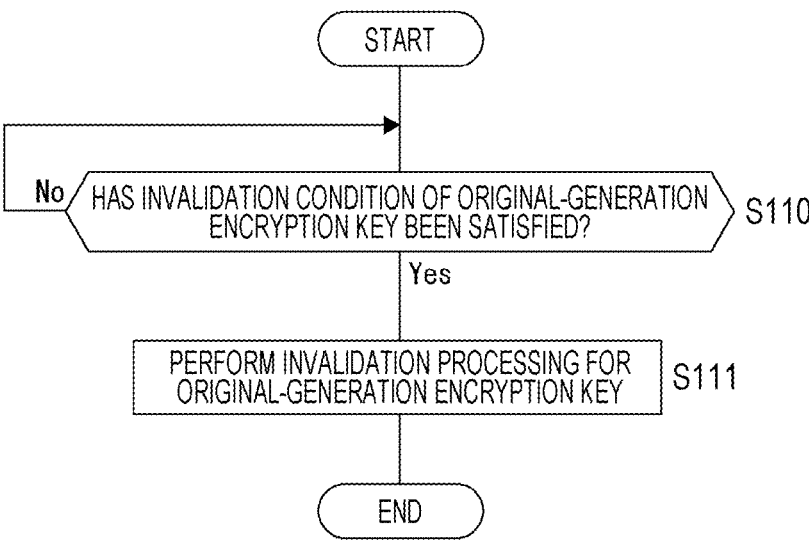

START

No — HAS INVALIDATION CONDITION OF ORIGINAL-GENERATION ENCRYPTION KEY BEEN SATISFIED? — S110

Yes

PERFORM INVALIDATION PROCESSING FOR ORIGINAL-GENERATION ENCRYPTION KEY — S111

END

INFORMATION PROCESSING APPARATUS, INFORMATION PROCESSING METHOD, AND RECORDING MEDIUM

CROSS-REFERENCE TO RELATED APPLICATIONS

The present application is based on PCT filing PCT/JP2022/034238, filed Sep. 13, 2022, which claims priority from Japanese Patent Application No. 2021-173396, filed Oct. 22, 2021, the entire contents of each are incorporated herein by reference.

TECHNICAL FIELD

The present technology relates to a technology related to encryption of artificial intelligence (AI) software used by an imaging apparatus that performs image recognition processing using an artificial intelligence model on a captured image obtained by imaging a subject.

BACKGROUND ART

A solution business using an imaging apparatus (hereinafter referred to as "artificial intelligence (AI) camera"), which performs image recognition processing using an artificial intelligence model for a captured image, is conceivable. For example, there may be a business that provides a system in which one or more AI cameras are arranged within a store, a recognition result regarding an attribute (e.g., gender, age group, etc.) and a behavior pattern of a shopper is obtained by image recognition processing, and the recognition result is presented to a user (system user) via the Internet or the like.

Since image recognition processing is performed on the AI camera side, the processing can be distributed and the amount of communication data can be reduced compared to a system in which the server apparatus side performs image recognition processing on the basis of the captured image acquired from each camera.

Note that Patent Document 1 below can be cited as a related art. Patent Document 1 below discloses an encryption processing technology for data handled by an AI camera.

CITATION LIST

Patent Document

Patent Document 1: WO 2020/255575

SUMMARY OF THE INVENTION

Problems to be Solved by the Invention

It is desirable here that AI software used by the AI camera (software including at least AI model software) can be updated from the outside for a function update or the like.

On the other hand, since each AI camera can perform relatively advanced image recognition, there is a possibility that damage will increase in a case where the system is abused by a third party other than the authorized user. It is thus desirable that the AI software be subjected to encryption processing and transmitted to the AI camera.

At this time, considering a case where security is not maintained due to leakage of a key used for encryption or decryption, it is conceivable to update the encryption key or the decryption key.

However, in a system using an AI camera, there is a case where a system administrator (service operator) and a service user (customer) individually manage a plurality of types of keys used for creating an encryption key, or other cases. For example, in such a case, it may be difficult to update the encryption key.

The present technology has been made in view of the above circumstances, and an object of the present technology is to reduce labor related to an update of an encryption key in response to encryption key leakage or the like.

Solutions to Problems

An information processing apparatus according to the present technology includes an encryption key creation part that creates an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, the encryption key creation part creating, in response to specification of a key derived from new information different from original information as the third type key, a new encryption key based on the third type key derived from the new information, the first type key, and the second type key on the basis of the new information.

With the above configuration, in the case of adopting a system operation mode in which there is a system administrator, who manages the entire camera system using the imaging apparatus, and a customer, who acts as a user of the camera system, the system administrator side encrypts AI software, and the customer side acquires the encrypted AI software from the system administrator side and transmits the acquired AI software to the imaging apparatus, the update of the encryption key for the AI software can be easily achieved by the customer side simply instructing the update of the third type key.

BRIEF DESCRIPTION OF DRAWINGS

FIG. 4 is a functional block diagram for explaining a function related to encryption of AI software included in the information processing apparatus as the embodiment.

FIG. 5 is a diagram illustrating an image of registration information of customers managed in the information processing apparatus as the embodiment.

FIG. 6 is a diagram illustrating a flow of processing when AI software is first deployed to an imaging apparatus.

FIG. 11 is an explanatory diagram of a load balancing method using a load balancer.

FIG. 12 is an explanatory diagram of a load balancing method using job queues.

FIG. 13 is a flowchart of processing related to an update of an encryption key in the embodiment.

FIG. 14 is a flowchart of processing related to invalidation of an encryption key in the embodiment.

MODE FOR CARRYING OUT THE INVENTION

Hereinafter, an embodiment according to the present technology will be described in the following order with reference to the accompanying drawings.
<1. Information Processing System>
(1-1. Overall System Configuration)
(1-2. Configuration of information processing apparatus)
(1-3. Configuration of Imaging apparatus)
<2. Encryption Related Processing as Embodiment>
<3. Processing Procedure>
<4. Modifications>
<5. Summary of Embodiment>
<6. Present Technology>

1. Information Processing System (1-1. Overall System Configuration)

Figure 1:
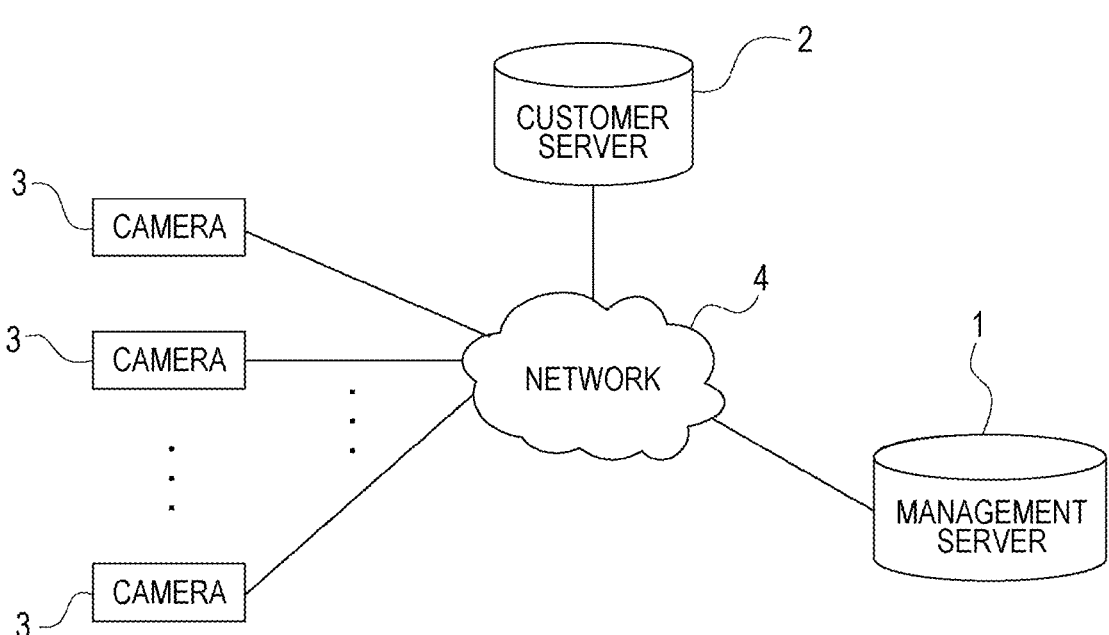
FIG. 1 is a block diagram illustrating a schematic configuration example of an information processing system as an embodiment.

FIG. 1 is a block diagram illustrating a schematic configuration example of an information processing system 100 as an embodiment according to the present technology. As illustrated in the drawing, the information processing system 100 includes a management server 1, a customer server 2, and a plurality of cameras 3. In the present example, the management server 1, the customer server 2, and each camera 3 are configured to be able to perform data communication via a network 4 such as the Internet.

The management server 1 and the customer server 2 are each configured as an information processing apparatus equipped with a microcomputer including a central processing unit (CPU), a read-only memory (ROM), and a random-access memory (RAM).

Here, the customer server 2 is an information processing apparatus assumed to be used by a customer (service user) who receives a service using the information processing system 100. In addition, the management server 1 is an information processing apparatus assumed to be used by a service provider, in other words, an administrator of the entire information processing system 100.

Each camera 3 includes, for example, an image sensor such as a charge-coupled device (CCD) type image sensor or a complementary metal-oxide-semiconductor (CMOS) type image sensor, and images a subject to obtain image data (captured image data) as digital data. Furthermore, as will be described later, each camera 3 also has a function of performing image recognition using an AI model for a captured image.

Each camera 3 can transmit various types of data such as processing result information indicating a result of image recognition processing using the AI model to a predetermined external information processing apparatus (e.g., the information processing apparatus or the like used by the customer) or receive various types of data from the external information processing apparatus via the network 4.

Here, the information processing system 100 illustrated in FIG. 1 is assumed to be used such that the predetermined information processing apparatus creates analysis information of a subject on the basis of processing result information obtained by the image recognition processing for each camera 3 and allows the user to browse the created analysis information via the information processing apparatus used by the user.

In this case, as the application of each camera 3, the applications of various types of monitoring cameras are conceivable. The examples thereof include the applications of monitoring cameras for the indoors such as stores, offices, and houses, monitoring cameras (including traffic monitoring cameras, etc.) for monitoring the outdoors such as parking lots and streets, monitoring cameras for manufacturing lines in factory automation (FA) and industrial automation (IA), and in-vehicle monitoring cameras.

For example, in the case of the application of a monitoring camera in a store, it is conceivable to arrange a plurality of cameras 3 at predetermined positions in the store so that the user can check customer demographics (gender, age group, etc.), actions (line of movement) within the store, and the like. In this case, as the analysis information described above, it is conceivable to create information of the customer demographics, information on the line of movement, and the like.

Alternatively, in the case of the application of a traffic monitoring camera, it is conceivable to dispose each camera 3 at a position near the road so that the user can recognize information such as the number (vehicle number), the color of the vehicle, the vehicle type, and the like regarding the passing vehicle. In this case, it is conceivable to create information such as the number, the color of the vehicle, the vehicle type, and the like as the analysis information described above.

In addition, in a case where a traffic monitoring camera is used in a parking lot, it is conceivable to dispose a camera so as to be able to monitor each parked vehicle, monitor whether or not a suspicious person performing suspicious behavior is around each vehicle, and in a case where there is a suspicious person, notify that there is a suspicious person, an attribute (gender, age group, clothes, etc.) of the suspicious person, and the like.

The management server 1 is an embodiment of the information processing apparatus according to the present technology, and executes various types of processing for managing the information processing system 100.

For example, the management server 1 performs processing related to various types of authentication for the camera 3 and the customer (license authorization function). Specifically, processing related to device authorization of each camera 3 and processing related to authentication for each of the AI model, application software, and firmware used by the camera 3 are performed.

Here, the above application software means software necessary for appropriately achieving the image recognition processing using the AI model in the camera 3.

To appropriately perform the image recognition processing based on the captured image and output the result of the image recognition processing in an appropriate model, it is required to control the data input to the AI model and appropriately process the output data of the AI model. The application software described above is software including peripheral processing necessary for appropriately achieving the image recognition processing by the AI model. Such software can be rephrased as software for achieving a desired function using an AI model, and is thus hereinafter referred to as "AI-utilizing software".

The above firmware is software as firmware for enabling the camera 3 to execute image recognition processing using the AI model.

Hereinafter, among the AI model software, the AI-utilizing software, and the firmware described above, software including at least the AI model software is referred to as "AI software".

The following description provides an example where the AI software to be encrypted is the AI model software alone. However, the AI software to be encrypted may include the AI model software and AI-utilizing software, or may include the AI model software, AI-utilizing software, and firmware.

Furthermore, the management server 1 performs registration processing for various types of information related to a customer account.

Specifically, the management server 1 receives input of customer information (user information) from the customer server 2 or the like, creates account information on the basis of the input customer information (creates account information including at least a customer identification (ID) and password information), and performs account information registration processing.

In addition, the management server 1 also performs processing of associating the camera 3 (camera ID) purchased by the customer with the customer ID.

Here, the information processing system 100 of the present example has a specification in which each camera 3 can be used by registering the camera 3 purchased by the customer on the system administrator side.

Furthermore, in the information processing system 100 of the present example, the AI software to be used by the camera 3 is required to be registered in advance on the system administrator side. The management server 1 issues a software ID for the AI software for which registration has been applied, and performs processing of associating the AI software with the camera ID of the camera 3 using the AI software.

For the AI software, software common to all the cameras 3 purchased by the customer may be installed, or different software may be installed in at least some of the cameras 3.

In addition, the management server 1 in the present example performs encryption processing for the AI software, encryption key creation processing for encryption, and other processing.

Note that the details of the encryption key creation processing, the AI software encryption processing, and the registration processing for various types of information such as account information described above will be described later again.

The customer server 2 mainly performs processing for installing the AI software on each camera 3. In the present example, the customer server 2 acquires the encrypted AI software from the management server 1, and the customer server 2 transmits the encrypted AI software to the camera 3. Therefore, the customer server 2 first instructs the management server 1 to execute the encryption of the AI software to be installed in the camera 3 (encryption request). Then, the AI software encrypted in response to the encryption request is acquired from the management server 1, and the acquired encrypted AI software is transmitted to the camera 3 and installed.

In the camera 3, the encrypted AI software is decrypted using a decryption key for the encryption key used for encryption in the management server 1, and the details of the encryption key and the decryption key in the present example will be described later.

Here, the transmission processing for installing the AI software in the camera 3 in a usable state is hereinafter referred to as "deployment".

(1-2. Configuration of Information Processing Apparatus)

Figure 2:
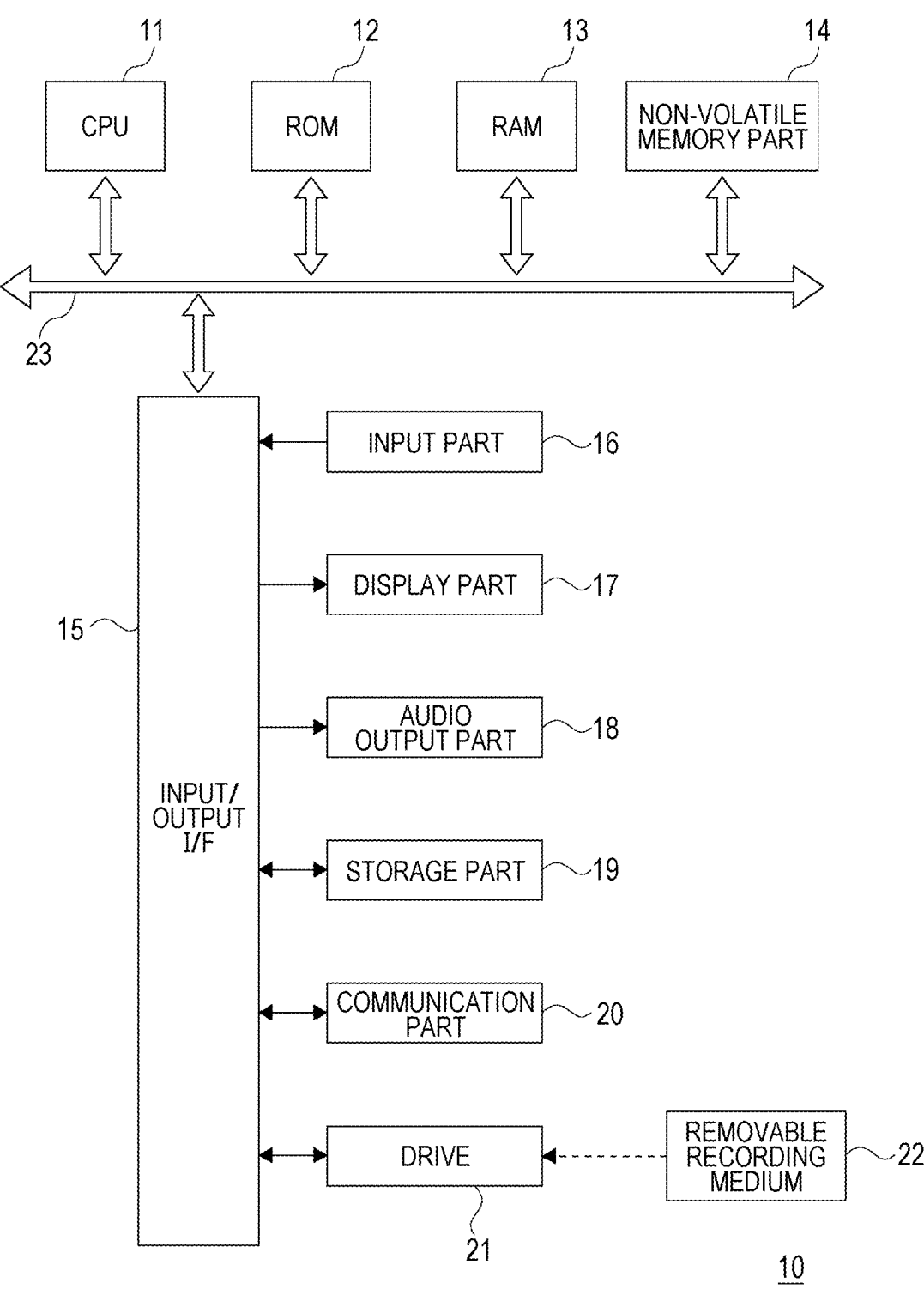
FIG. 2 is a block diagram illustrating a hardware configuration example of an information processing apparatus as an embodiment.

FIG. 2 is a block diagram illustrating a hardware configuration example of an information processing apparatus 10 that can be used as the management server 1 and the customer server 2 illustrated in FIG. 1.

As illustrated in the drawing, the information processing apparatus 10 includes a CPU 11. The CPU 11 functions as an arithmetic processing part that performs various types of processing described above as the processing of each of the management server 1 and the customer server 2, and executes various types of processing according to a program stored in a non-volatile memory part 14, such as a ROM 12 or an electrically erasable programmable read-only memory (EEP-ROM), or a program loaded from a storage part 19 to a RAM 13. The RAM 13 also appropriately stores data and the like necessary for the CPU 11 to execute various types of processing.

The CPU 11, the ROM 12, the RAM 13, and the non-volatile memory part 14 are connected to each other via a bus 23. An input/output interface (I/F) 15 is also connected to the bus 23.

An input part 16 including an operation element and an operation device is connected to the input/output interface 15. For example, as the input part 16, various types of operation elements and operation devices such as a keyboard, a mouse, a key, a dial, a touch panel, a touch pad, and a remote controller are assumed.

An operation is detected by the input part 16, and a signal corresponding to the detected operation is interpreted by the CPU 11.

Furthermore, a display part 17 including a liquid crystal display (LCD), an organic electro-luminescence (EL) panel, or the like, and an audio output part 18 including a speaker or the like are integrally or separately connected to the input/output interface 15.

The display part 17 is used for displaying various types of information, and includes, for example, a display apparatus provided in a housing of the information processing apparatus 10, a separate display apparatus connected to the information processing apparatus 10, or the like.

The display part 17 executes display of an image for various types of image processing, a moving image to be processed, or the like, on a display screen on the basis of an instruction from the CPU 11. Furthermore, the display part 17 displays various operation menus, icons, messages, and the like, that is, displays as a graphical user interface (GUI) on the basis of the instruction from the CPU 11.

In some cases, a storage part 19 including a hard disk drive (HDD), a solid-state memory, or the like, and a communication part 20 including a modem or the like are connected to the input/output interface 15.

The communication part 20 performs communication with communication processing via a transmission line such as the Internet, wired/wireless communication with various devices, bus communication, or the like.

Furthermore, a drive 21 is also connected to the input/output interface 15 as necessary, and a removable recording medium 22, such as a magnetic disk, an optical disk, a magneto-optical disk, or a semiconductor memory, is mounted appropriately.

A data file such as a program used for each processing can be read from the removable recording medium 22 by the drive 21. The read data file is stored in the storage part 19, and an image or audio included in the data file is output by the display part 17 or the audio output part 18. Furthermore, a computer program or the like read from the removable recording medium 22 is installed in the storage part 19 as necessary.

In the information processing apparatus 10 having the hardware configuration as described above, for example, software for the processing of the present embodiment can be installed via network communication by the communication part 20 or a removable recording medium 22. Alternatively, the software may be stored in advance in the ROM 12, the storage part 19, or the like.

The CPU 11 performs processing operations on the basis of various programs, thereby executing information processing and communication processing necessary as the management server 1 and the customer server 2 described above.

Note that the information processing apparatus 10 is not limited to a single computer apparatus as illustrated in FIG. 2, and may be configured by systematizing a plurality of computer apparatuses. The plurality of computer apparatuses may be systematized by a local area network (LAN) or the like, or may be disposed in a remote place by a virtual private network (VPN) or the like using the Internet or the like. The plurality of computer apparatuses may include a computer apparatus as a server group (cloud) that can be used by a cloud computing service.

(1-3. Configuration of Imaging Apparatus)

Figure 3:
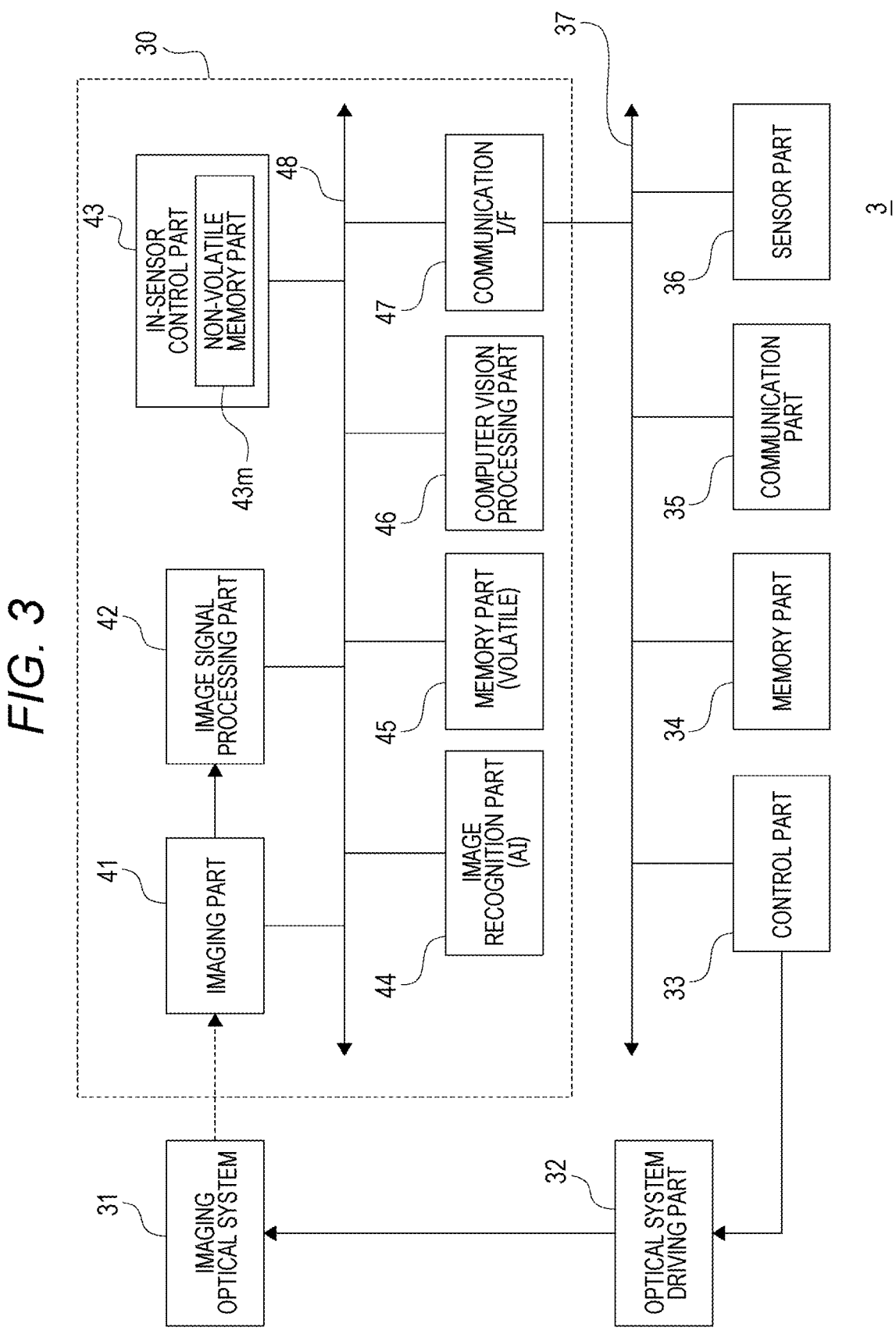
FIG. 3 is a block diagram illustrating a configuration example of an imaging apparatus included in the information processing system as the embodiment.

FIG. 3 is a block diagram illustrating a configuration example of the camera 3.

As illustrated in the drawing, the camera 3 includes an image sensor 30, an imaging optical system 31, an optical system driving part 32, a control part 33, a memory part 34, a communication part 35, and a sensor part 36. The image sensor 30, the control part 33, the memory part 34, the communication part 35, and the sensor part 36 are connected via a bus 37, and can perform data communication with each other.

The imaging optical system 31 includes lenses such as a cover lens, a zoom lens, and a focus lens, and a diaphragm (iris) mechanism. Light (incident light) from a subject is guided by the imaging optical system 31 and condensed on a light receiving surface of the image sensor 30.

The optical system driving part 32 comprehensively the driving parts of the zoom lens, the focus lens, and the diaphragm mechanism included in the imaging optical system 31. Specifically, the optical system driving part 32 includes an actuator for driving each of the zoom lens, the focus lens, and the diaphragm mechanism, and a driving circuit of the actuator.

The control part 33 includes, for example, a microcomputer including a CPU, a ROM, and a RAM, and performs the overall control of the camera 3 by the CPU executing various types of processing according to a program stored in the ROM or a program loaded in the RAM.

Furthermore, the control part 33 instructs the optical system driving part 32 to drive the zoom lens, the focus lens, the diaphragm mechanism, and the like. The optical system driving part 32 executes the movement of the focus lens and the zoom lens, the opening and closing of the diaphragm blade of the diaphragm mechanism, and the like in response to these driving instructions.

Furthermore, the control part 33 controls the writing and reading of various types of data to and from the memory part 34.

The memory part 34 is a non-volatile storage apparatus such as an HDD or a flash memory apparatus, for example, and is used for storing data that is used when the control part 33 executes various types of processing. Furthermore, the memory part 34 can also be used as a storage destination (recording destination) of the image data output from the image sensor 30.

The control part 33 performs various types of data communication with an external apparatus via the communication part 35. The communication part 35 in the present example is configured to be able to communicate via the network 4 illustrated in FIG. 1 and to be able to perform data communication with at least the customer server 2.

The sensor part 36 comprehensively represents a sensor other than the image sensor 30 included in the camera 3. Examples of the sensor included in the sensor part 36 include a global navigation satellite system (GNSS) sensor for detecting the position and altitude of the camera 3, an altitude sensor, a temperature sensor for detecting environmental temperature, and a motion sensor such as an acceleration sensor or an angular velocity sensor for detecting the motion of the camera 3.

The image sensor 30 is configured as a solid-state imaging element of a CCD type, a CMOS type, or the like, for example. As illustrated in the drawing, the image sensor includes an imaging part 41, an image signal processing part 42, an in-sensor control part 43, an image recognition part 44, a memory part 45, a computer vision processing part 46, and a communication interface (I/F) 47 as illustrated in the drawing, and each can perform data communication with each other via a bus 48.

The imaging part 41 includes a pixel array part in which pixels having photoelectric conversion elements such as photodiodes are two-dimensionally arranged, and a readout circuit that reads out an electric signal obtained by photoelectric conversion from each pixel included in the pixel array part.

In this readout circuit, for example, correlated double sampling (CDS) processing, automatic gain control (AGC) processing, and the like are executed for an electric signal obtained by photoelectric conversion, and analog/digital (A/D) conversion processing is further executed.

The image signal processing part 42 executes preprocessing, synchronization processing, YC creation processing, resolution conversion processing, codec processing, and other processing on the captured image signal as digital data after the A/D conversion processing.

In the preprocessing, clamp processing of clamping black levels of red (R), green (G), and blue (B) to a predetermined level, correction processing between color channels of R, G, and B, and other processing are performed on the captured image signal. In the synchronization processing, color separation processing is performed such that image data for each pixel has all the R, G, and B color components. For example, in the case of an imaging element using a Bayer array color filter, demosaic processing is executed as color separation processing. In the YC creation processing, a luminance (Y) signal and a color (C) signal are created (separated) from the image data of R, G, and B. In the resolution conversion processing, the image data subjected to various types of signal processing is subjected to resolution conversion processing.

In the codec processing, for example, encoding processing for recording or communication and file creation are performed on the image data subjected to the various types of processing described above. In the codec processing, it is possible to create a file in a format such as moving picture experts group (MPEG)-2 or H.264 as a moving image file format. It is also conceivable to create a file in a format such as joint photographic experts group (JPEG), tagged image file format (TIFF), or graphics interchange format (GIF) as a still image file.

The in-sensor control part 43 includes a microcomputer including, for example, a CPU, a ROM, a RAM, and the like, and integrally controls the operation of the image sensor 30. For example, the in-sensor control part 43 gives an instruction to the imaging part 41 to perform execution control on the imaging operation. In addition, the execution control of processing is also performed on the image signal processing part 42.

The in-sensor control part 43 includes a non-volatile memory part 43m. The non-volatile memory part 43m is used for storing data used by the CPU of the in-sensor control part 43 in various types of processing.

The image recognition part 44 includes a programmable arithmetic processing apparatus such as a CPU, a field programmable gate array (FPGA), or a digital signal processor (DSP), and performs image recognition processing using an AI model on a captured image.

Basically, as the image recognition processing (i.e., the image recognition processing using the AI model) by the image recognition part 44, processing of recognizing a target subject is performed.

The function of the image recognition by the image recognition part 44 can be switched by changing the algorithm of the image recognition processing, that is, the AI model.

Although various types of functions of specific image recognition are conceivable, for example, the following types can be exemplified.

Class identification
Semantic segmentation
Human detection
Vehicle detection
Target tracking
Optical character recognition (OCR)

Among the above function types, the class identification is a function of identifying a target class. In this context, the term "class" refers to information indicating a category of an object, and distinguishes, for example, "person", "car", "airplane", "ship", "truck", "bird", "cat", "dog", "deer", "frog", "horse", and the like.

The target tracking is a function of tracking a targeted subject, and can be described as a function of obtaining history information of the location of the subject.

The memory part 45 includes a volatile memory, and is used to hold (temporarily store) data necessary for the image recognition part 44 to perform image recognition processing. Specifically, the memory part 45 is used to hold at least AI model software. In addition, the memory part 45 is also used to hold data used in processing performed by the image recognition part 44 using the AI model.

In the present example, the memory part 45 is also used to hold captured image data processed by the image signal processing part 42.

The computer vision processing part 46 performs rule-based image processing as image processing on the captured image data. Examples of the rule-based image processing here include super-resolution processing and other processing.

The communication interface 47 is an interface that communicates with each part connected via the bus 37, such as the control part 33 and the memory part 34 outside the image sensor 30. For example, the communication interface 47 performs communication for acquiring AI-utilizing software, an AI model, and the like used by the image recognition part 44 from the outside on the basis of the control of the in-sensor control part 43.

Furthermore, result information of image recognition processing by the image recognition part 44 is output to the outside of the image sensor 30 via the communication interface 47.

2. Encryption Related Processing as Embodiment

The management server 1 performs various types of processing related to encryption of AI software with respect to the information processing system 100 including the camera 3 as the AI camera.

FIG. 4 is a functional block diagram for explaining a function related to encryption of AI software included in the CPU 11 of the management server 1.

As illustrated in the drawing, the management server 1 has functions as a registration processing part F1, an encryption key creation processing part F2, an encryption processing part F3, and a transmission processing part F4.

The registration processing part F1 performs registration processing for various types of information necessary for a customer to receive provision of a service by the information processing system 100.

In the present example, in the reception of the service provided by the information processing system 100, the customer purchases the camera 3 as a compatible product compatible for use with the information processing system 100. At this time, in the camera 3 as the compatible product, information as a "master key" used for creating a key for encrypting and decrypting AI software is stored in the image sensor 30 at the time of manufacturing the image sensor 30, for example. This master key is stored in a predetermined non-volatile memory in the image sensor 30, such as the non-volatile memory part 43m in the in-sensor control part 43.

As described above, the master key, which is used for encrypting and decrypting the AI model and the AI-utilizing software acquired (e.g., purchased) by the customer, is stored in the image sensor 30, enabling only the image sensor 30 to decrypt these AI model and AI-utilizing software. In other words, it is possible to prevent the other image sensors 30 from illegally using the AI model and the AI-utilizing software.

As the master key, a different key can be allocated to each individual image sensor 30. Alternatively, the master key may be a key common to at least some of the image sensors 30, such as a key different for each model of the image sensor 30.

As an illustrative example, it is assumed below that a different key is allocated to each model of the image sensor 30 as the master key.

As a procedure performed before starting to use the system, the customer performs a registration procedure for the purchased camera 3 and a user account.

Specifically, the customer connects all the purchased cameras 3 desired to be used to the specified cloud, that is, the management server 1 in the present example.

In this state, the customer inputs information for registering the camera 3 and the customer account to the management server 1 by using an information processing apparatus such as the customer server 2, for example.

The registration processing part F1 creates the account information of the customer on the basis of the input information from the customer. Specifically, the account information including at least a customer ID and password information is created.

Furthermore, while creating the account information of the customer, the registration processing part F1 performs processing of acquiring at least information of a chip ID (the ID of the image sensor 30) and a camera ID (the ID of the camera 3) from the connected camera 3 and associating the acquired information with the created account information.

Here, the chip ID is an ID allocated to the image sensor 30 in the camera 3, and is stored in a predetermined non-volatile memory such as the non-volatile memory part 43*m* in the image sensor 30, for example. In the present example, the chip ID is information that can identify each image sensor 30 (i.e., a unique ID for each individual image sensor).

In addition, the camera ID is an ID allocated to each camera 3 and can identify each camera 3, and is stored in a predetermined non-volatile memory in the camera 3 such as the memory part 34, for example.

Furthermore, in the present example, the registration processing part F1 also performs the registration processing for a customer management key.

The customer management key is a key used to create the encryption key for encrypting the AI software. In the present example, the customer management key is a key defined for a customer, and for example, a different key is defined for each customer. Alternatively, for the customer management key, a common key may be used by at least some customers, for example, a common key is used by all the customers.

As an illustrative example, it is assumed below that a different key is defined for each customer as the customer management key.

The registration processing part F1 performs processing of registering a customer management key defined for the customer in association with the customer ID of the customer.

FIG. 5 illustrates an image of registration information of customers managed by the management server 1.

By the registration processing part F1 performing the processing described above, in the management server 1, the correspondence relationship among the customer ID, the camera ID, the chip ID, the master key, and the customer management key is managed for the information regarding the customer as illustrated in the drawing. Specifically, each customer ID is associated with the camera ID, the chip ID, and the master key of the corresponding camera 3 registered by the customer indicated by the customer ID. Furthermore, each customer ID is associated with the information of the customer management key.

Here, the master key is prepared in advance by the system administrator and stored in the image sensor 30 as a compatible product. Therefore, the system administrator side knows the correspondence relationship as to which master key is stored in which image sensor 30, and the management server 1 can manage the association between the chip ID and the master key as illustrated in FIG. 5.

In addition, the registration processing part F1 also handles registration processing for the AI software from the customer side.

In the information processing system 100 of the present example, since the management server 1 encrypts the AI software as described above, the customer registers the AI software to be used by the camera 3 on the management server 1 side in advance.

In the management server 1, the registration processing part F1 issues a software ID for the AI software for which registration has been applied, and manages the applied AI software using the software ID.

Furthermore, in FIG. 4, the encryption key creation processing part F2 creates an encryption key used for encrypting the AI software.

The encryption processing part F3 encrypts the AI software with the encryption key created by the encryption key creation processing part F2.

The transmission processing part F4 performs processing of transmitting the AI software encrypted by the encryption processing part F3 (hereinafter referred to as "encrypted AI software") to an external apparatus, specifically, the customer server 2 in the present example.

Here, for specific understanding of the encryption key creation processing part F2, the encryption processing part F3, and the transmission processing part F4 described above, a flow of processing related to the encryption of the AI software and the deployment of the AI software in the information processing system 100 of the present example will be described with reference to FIG. 6.

FIG. 6 illustrates a flow of processing when the AI software is first deployed to the camera 3.

As described above, in the present example, the program data of the AI model is deployed in the memory part 45 as a volatile memory, thereby necessitating the deployment of the AI software every time the camera 3 is activated.

First, to cause the camera 3 to use the AI software, the customer registers the AI software in the management server 1 in advance as indicated by <1> in the drawing. As described as the processing by the registration processing part F1, the registered AI software is managed by the software ID issued to the AI software.

Then, in the deployment of the AI software to the camera 3, the customer causes the customer server 2 to make an encryption request to the management server 1 (cf. <2> in the drawing). As the encryption request, a request specifying a chip ID, a software ID, and key generation information (KG) is made.

Here, the key generation information corresponds to an example of a "third type key" according to the present technology, and functions as information specifying the generation of the encryption key used for the encryption of the AI software.

Since this is the first deployment, information indicating a first generation is transmitted as key generation information. Hereinafter, the generation of the encryption key indicated by the key generation information is referred to as "KG". In addition, the difference in the generation of the encryption key is represented by a numerical value following KG. For example, the first generation is represented as "KG1", and a second generation is represented as "KG2".

The management server 1 that has received the encryption request from the customer server 2 creates an encryption key on the basis of the information content of the encryption request as indicated by <3>. Specifically, since KG1 has been specified here as the generation of the encryption key, the first-generation encryption key (KG1) is created.

Here, in the present embodiment, the encryption key used for encrypting the AI software is created as an encryption key based on at least the master key, the customer management key, and the key generation information.

Specifically, in the present example, the encryption key is created by multiplying the master key, the chip ID, the customer management key, and the key generation information. More specifically, it is created as "Hash (master key‖chip ID‖customer management key‖key generation information)".

At this time, the chip ID used for creating the encryption key is the chip ID specified by the encryption request. In addition, in the present example, the master key used to create the encryption key is the master key specified from the chip ID and the ID of the customer who has made the encryption request (cf. FIG. 5).

In response to the creation of the encryption key, the management server 1 encrypts the specified AI software with the encryption key (KG1) as indicated by <4> in the drawing.

Then, the management server 1 performs processing of transmitting the AI software encrypted with the encryption key (KG1) to the customer server 2 (cf. <5> in the drawing).

The customer server 2 that has received the encrypted AI software performs processing of deploying the encrypted AI software to the target camera 3 (cf. <6> in the drawing). That is, the processing of transmitting the encrypted AI software to the target camera 3 and installing the AI software is performed.

At this time, in the camera 3, the customer key corresponding to KG1 is stored in advance together with the master key.

The customer key is a key obtained by multiplying the customer management key by the key generation information (KG1 in this case, because it is the time of initial deployment).

Note that, although the customer key is stored in the image sensor 30 in this example, the customer key can also be stored outside the image sensor 30 within the camera 3.

In the camera 3, a decryption key for decrypting the encrypted AI software can be created on the basis of the master key, the chip ID, and the customer key (KG1) stored in advance. Specifically, in the present example, the decryption key can be created using "Hash (master key‖chip ID‖customer key (the product of the customer management key and the key generation information)".

As indicated by <7> in the drawing, the camera 3 decrypts the encrypted AI software transmitted from the customer server with the decryption key. As a result, in the camera 3, the AI software can be installed in a usable state.

Here, in the present example, the customer key is stored in the camera 3, that is, the key, obtained by multiplying the customer management key and the key generation information, is stored. However, instead of this, the customer management key and the key generation information may be individually stored without being multiplied.

From this point, it can be said that as the key generation information (third type key), the key multiplied by the customer management key is stored in the camera 3 or the key stored in the camera 3 together with the customer management key.

In the present example, the customer key is a software key included in the firmware of the camera 3. In this case, the customer key can be updated by updating the firmware of the camera 3.

Note that using the customer key (or at least one of the customer management key and the key generation information in a case where the customer management key and the key generation information are individually stored) stored in the camera 3 as the software key is merely an example, and the it is not limited thereto.

Here, although FIG. 6 illustrates deployment for only one camera 3, in a case where there is a plurality of cameras 3 that can be used by the customer, for example, there is a case where AI software to be used is different between at least some of the cameras 3, such as a case where a certain camera 3 uses AI software for each type A and a case where another camera 3 uses AI software for each type B.

In this case, the customer causes the management server 1 to execute encryption for each of the AI software.

In addition, in a case where there is a plurality of cameras 3 that can be used by the customer, chip IDs are different among the cameras 3. It is also possible that master keys may be different.

Since the created decryption key is different among the cameras 3 having different chip IDs (and master keys), AI software encrypted with each of the different encryption keys should be transmitted. Therefore, the customer makes an encryption request specifying the corresponding chip ID for each camera 3 having a different chip ID and master key, and causes the corresponding encrypted AI software to be created and acquired for each camera 3.

Here, as described above, in the present embodiment, as the encryption key used for the encryption of the AI software, the encryption key based on at least the master key, the customer management key, and the key generation information is created. With this configuration, when the encryption key is updated in response to encryption key leakage or the like, it is possible to reduce labor related to the update of the encryption key.

Figure 7:
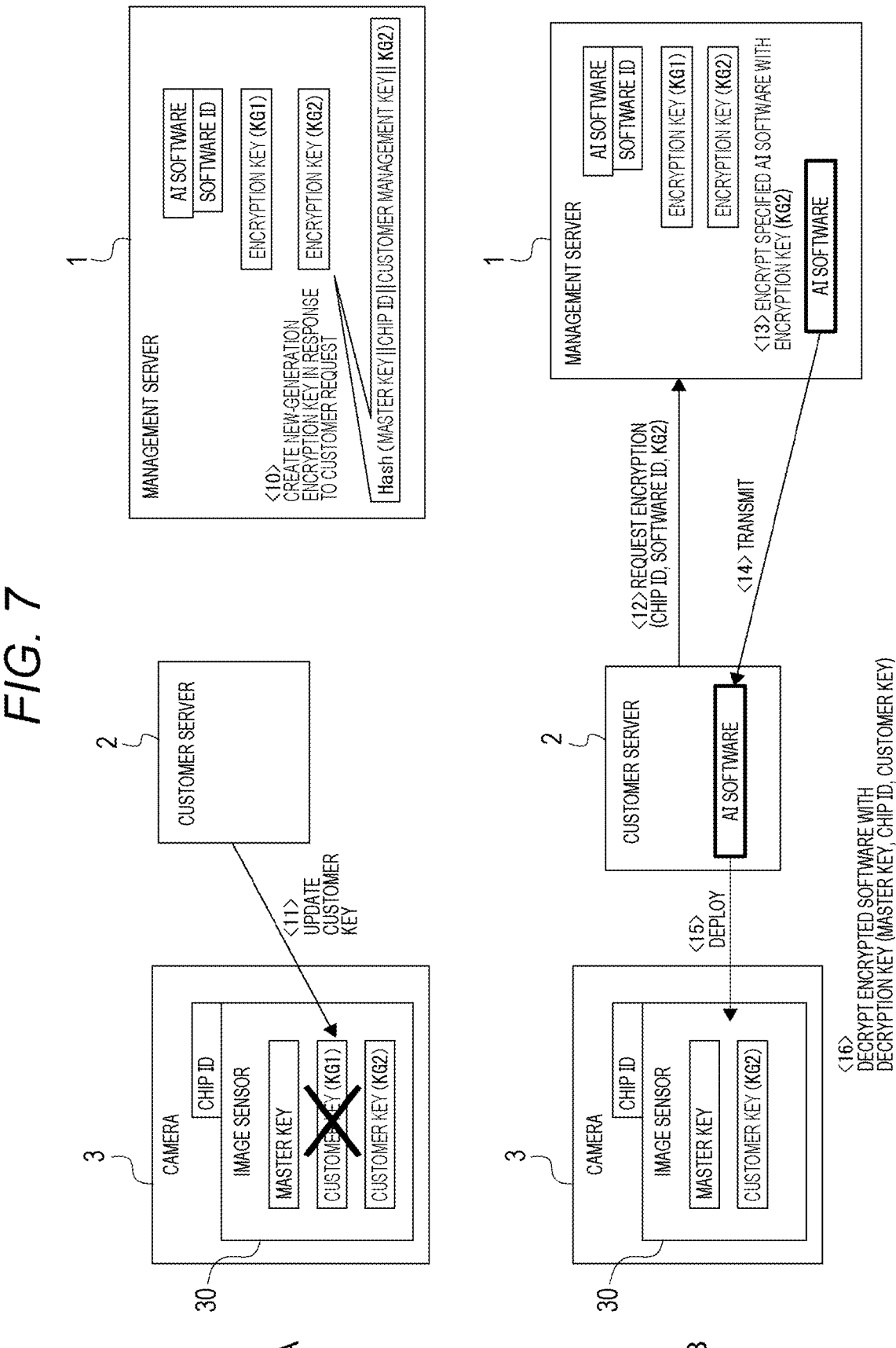
FIG. 7 is an explanatory diagram of a flow of processing for updating an encryption key in the embodiment.

A flow of processing for updating the encryption key in the embodiment will be described with reference to FIG. 7.

In a case where the encryption key is updated, the customer side first makes a request to the system administrator side to create a new-generation encryption key (a request to update the encryption key). In the present embodiment, the generation of the encryption key is updated by updating the key generation information used for creating the encryption key. Specifically, for example, if the original generation is KG1, an encryption key (KG2) of a new generation is obtained by creating an encryption key using key generation information indicating KG2.

In a case where there is a request for updating the encryption key from the customer side, the management server 1 creates a new-generation encryption key in response to the customer request as indicated by <10> in FIG. 7A. The drawing illustrates an example where a new encryption key is created by multiplying at least the master key, the chip ID, the customer management key, and key generation information indicating KG2, corresponding to a case where the original generation is KG1. Specifically, the new encryption key (KG2) in this case is created by "Hash (master key‖chip ID‖customer management key‖key generation information (KG2))".

The management server 1 acquires the customer management key corresponding to the customer who has requested the update of the encryption key on the basis of the correspondence relationship information managed as illustrated in FIG. 5 above, and uses the customer management key for creating the encryption key.

At this time, the request for the update is made by specifying the chip ID from the customer side. This is because an encryption key using the same chip ID as the chip ID of the camera 3 should be created.

The customer requests the update of the encryption key, and updates the customer key in the camera 3 as indicated by <11> in FIG. 7A.

Here, the customer key is created by multiplying the customer management key managed by the customer and the key generation information indicating the new generation.

In the present example, the processing for updating the customer key in the camera 3 to the new-generation customer key (KG2) is performed using the customer server 2.

The customer server 2 transmits the new-generation customer key to the camera 3 on the basis of the instruction from the customer and updates the customer key from the existing customer key. As described above, since the customer key is a software key in the present example, the update to the new-generation customer key can be performed as a firmware update in the camera 3.

Note that, as described above, the customer management key and the key generation information can be individually stored in the camera 3 without being multiplied. In this case, the generation of the key information in the camera 3 may be performed as the update of the key generation information to update the generation of the decryption key.

Since the generation of the customer key is updated to KG2 in the camera 3, a decryption key (KG2) for decrypting the AI software encrypted with the new encryption key (KG2) created by <10> can be created in the camera 3.

FIG. 7B illustrates a flow of deployment of the AI software after the update of the encryption key and the customer key for creating the decryption key as described above.

First, as indicated by <12> in the drawing, the customer causes the customer server 2 to make an encryption request to encrypt the AI software with the new-generation encryption key as an encryption request to the management server 1. As illustrated in the drawing, as the encryption request here, a request specifying the chip ID, the software ID of the AI software to be encrypted, and the key generation information of the new generation (here, KG2) is made.

In response to the encryption request, the management server 1 encrypts the specified AI software with the encryption key (KG2) and transmits the encrypted AI software to the customer server 2 as indicated by <13> and <14> in the drawing.

As indicated by <15> in the drawing, the customer server 2 deploys, to the target camera 3, the AI software encrypted with the encryption key (KG2) and received from the management server 1.

In the camera 3 in which the encrypted AI software has been deployed, the encrypted AI software is decrypted with the decryption key (master key, chip ID, customer key (KG2)) as indicated by <16>.

By adopting the method of updating the encryption key and the decryption key as described above, it is possible to securely update the encryption key and the decryption key in response to key leakage or the like, and the update of the encryption key is easily achieved only by the customer side instructing the management server 1 side to update the key generation information. For example, in a case where the key generation information is not used in the creation of the encryption key, and the customer management key is to be updated instead, it is necessary to re-register the customer management key on the management server 1 side. In contrast, as in the embodiment, the encryption key is set as a key based on the master key (first type key), the customer management key (second type key), and the key generation information (third type key), and the encryption key is updated using the new key generation information in response to specification of a new key generation information. This eliminates the need to re-register the customer management key on the management server 1 side in the update of the encryption key.

Figure 8:
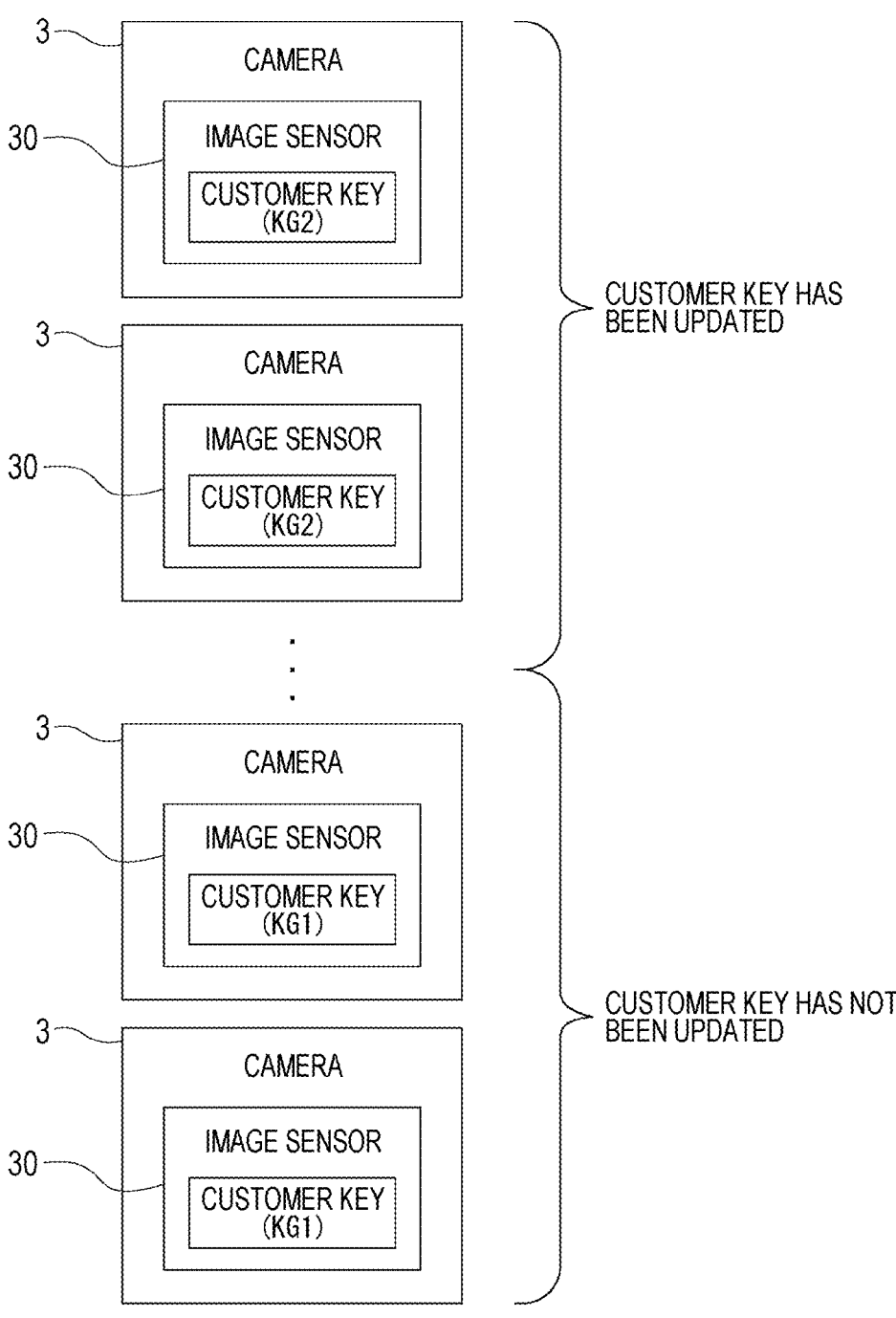
FIG. 8 is an explanatory diagram of a situation where an imaging apparatus with its customer key updated and an imaging apparatus with its customer key not updated coexist.

Here, in a case where the customer uses a plurality of cameras 3, such as several thousand or several tens of thousands, for example, it takes some time to update the customer keys of the cameras 3. That is, from the time the customer starts updating the customer key of the camera 3 until this is completed for all the cameras 3 to be used, a situation may arise where the camera 3 with its customer key updated and the camera 3 with its customer key not updated coexist, as illustrated in FIG. 8.

Assuming such a situation, in the management server 1 in the present embodiment, even in a case where the new-generation encryption key is created in response to a request from the customer, the original-generation encryption key is left without being invalidated (cf. FIGS. 7A and 7B). As a result, in a case where a situation arises where the AI software is deployed in the camera 3 with its customer key not updated, it is possible to deploy the decryptable encrypted AI software in the camera 3 with its customer key not updated.

Here, in the present embodiment, since the memory that deploys the program of the AI model is the volatile memory part 45, the camera 3 is restarted sequentially, for example, the camera 3 is restarted once a day. For this reason, in the present embodiment, each camera 3 is required to deploy the AI software sequentially, for example, once a day.

In a situation where the customer key of the camera 3 is updated over a certain period as described above on the premise that the camera 3 is sequentially restarted and the AI software is sequentially deployed to each camera 3 as described above, the management server 1 needs to perform encryption with the original-generation encryption key and encryption with the new-generation encryption key each time the camera 3 is restarted.

Furthermore, in the present example, since the chip ID used for the encryption key and the decryption key is a unique ID for each individual image sensor 30 (i.e., for each camera 3), AI software encrypted with a different encryption key is deployed in each camera 3. At this time, it is not desirable to create a different key for each camera 3 as an original-generation encryption key or a new-generation encryption key from the perspective of memory capacity and the like.

Therefore, in the present example, the encryption key is actually created in the form of "Hash (master key‖customer management key‖KGx)", which is not multiplied by the chip ID. This eliminates the need to hold a different encryption key for each camera 3. In this case, the creation of the encrypted AI software for each camera 3 is achieved by multiplying the encryption key created as described above by the chip ID specified in the encryption request to create the encryption key corresponding to the target camera 3, and encrypting the AI software specified by the encryption request with the encryption key.

Hereinafter, the encryption key in the format not multiplied by the chip ID as described above is referred to as a "basic encryption key". For the purpose of confirmation, note that the basic encryption key also belongs to an encryption key based on the "first type key", the "second type key", and the "third type key".

As described above, in the management server 1, it is necessary to perform encryption using the original-generation encryption key and encryption using the new-generation encryption key in a transition period in which the customer updates the customer key of the camera 3 to the new generation. In the present example, the encryption using the original-generation encryption key and the encryption using the new-generation encryption key are performed by parallel processing using virtualization technology. Specifically, in the present example, the encryption processing using the original-generation encryption key and the encryption processing using the new-generation encryption key can be performed in parallel through virtualization technology using containers.

In this context, the term "container" refers to a logical section formed on a host operating system (OS) of a computer apparatus. A library and the like necessary for operating an application are integrated into one container and handled as an individual server. The host OS (node) serves as a base for starting the container, and a plurality of containers can be launched on the base, and a plurality of applications can be operated in parallel.

Figure 9:
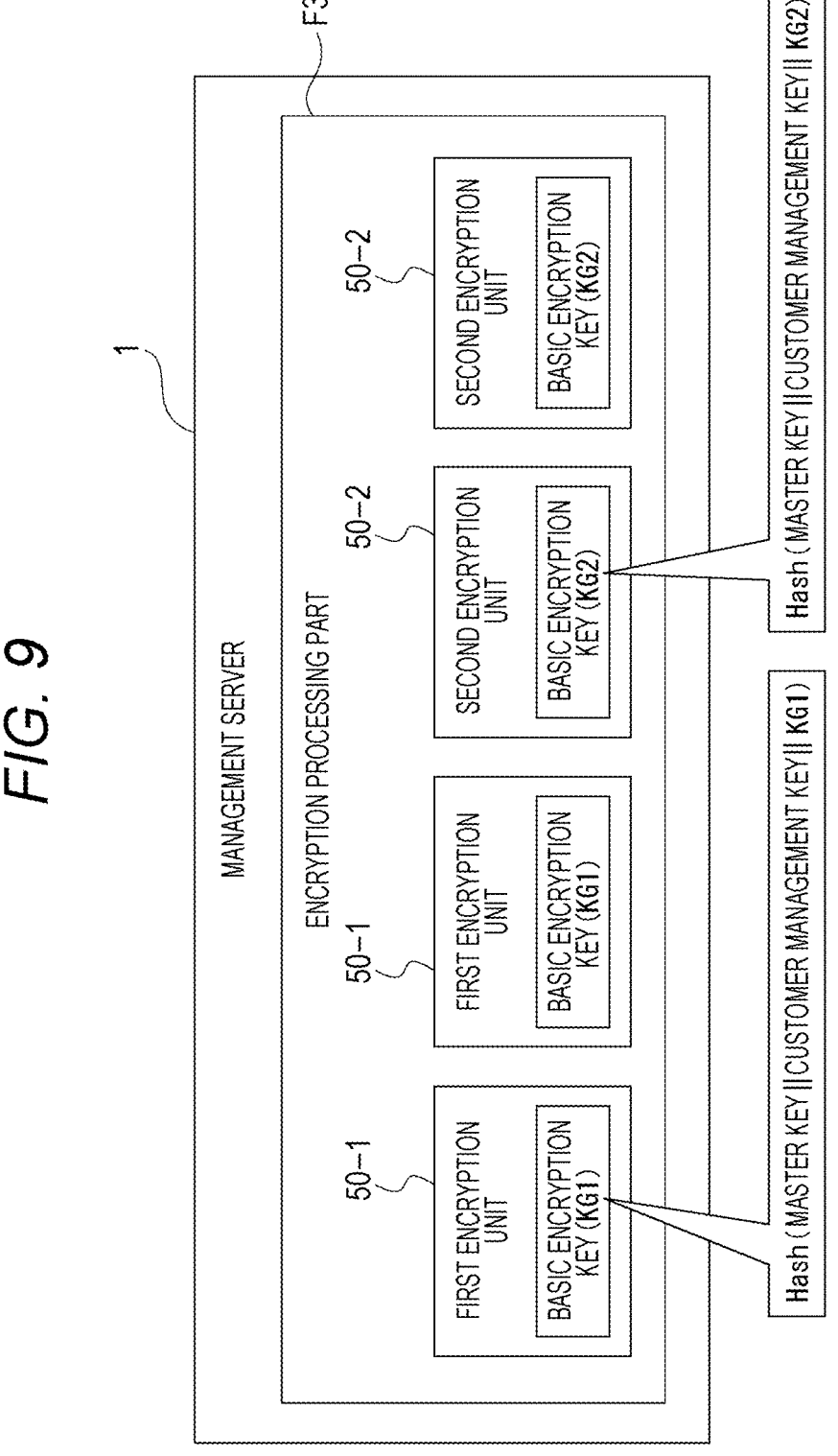
FIG. 9 is an explanatory diagram of an encryption unit 50 using containers.

FIG. 9 is an explanatory diagram of an encryption unit 50 using containers.

By using the container technology, one container can function as the encryption unit 50 that performs the encryption processing for the AI software.

In this case, the encryption unit 50 as a container includes a basic encryption key used for encryption. Specifically, a container (container image) as a first encryption unit 50-1 and a container as a second encryption unit 50-2 are prepared. The first encryption unit 50-1 includes a basic encryption key (KG1) of an original generation (here, KG1) and encrypts the AI software with an encryption key (KG1) created on the basis of the basic encryption key (KG1) and the chip ID specified in the encryption request. The second encryption unit 50-2 includes the basic encryption key (KG2) of a new generation (here, KG2) and encrypts the AI software with an encryption key (KG2) created on the basis of the basic encryption key (KG2) and the chip ID specified in the encryption request are prepared. Then, the containers as the first encryption unit 50-1 and the second encryption unit 50-2 are deployed in the management server 1, enabling the management server 1 to perform the encryption processing using the original-generation encryption key and the encryption processing using the new-generation encryption key in parallel, with the containers as the first encryption unit 50-1 and the second encryption unit 50-2.

From a functional perspective, it can be expressed that the encryption processing part F3 includes a plurality of first encryption units 50-1 and a plurality of second encryption units 50-2 as illustrated in FIG. 9.

Note that the method of deploying the encryption unit 50 that includes the encryption key, in the management server 1 as described above can be applied not only to the case of using the container technology but can also be similarly applied to the case of using another form of virtualization technology such as a hypervisor type.

Meanwhile, in a situation where the customer sequentially updates the customer key in the camera 3 as described above, the number of encryption requests using the original-generation encryption key (KG1) gradually decreases, and the number of encryption requests using the new-generation encryption key (KG2) gradually increases.

In view of this point, the encryption processing part F3 of the present embodiment performs rolling update processing of adjusting the number of the first encryption units 50-1 and the number of the second encryption units 50-2 on the basis of estimation information related to the number of updated cameras that are the cameras 3 with the customer keys updated. Specifically, in the present example, the encryption processing part F3 adjusts the number of the first encryption units 50-1 and the number of the second encryption units 50-2 on the basis of elapsed time information from a predetermined starting point timing.

For example, it can be said that elapsed time information from a predetermined starting point timing, which is an estimated timing to start updating the customer key in the camera 3, such as a timing at which the customer starts the customer key update operation in the camera 3 or a timing at which the customer requests the management server 1 to update the encryption key, correlates with the number of updated cameras. Therefore, the number of the first encryption units 50-1 and the number of the second encryption units 50-2 are adjusted on the basis of the elapsed time information by using the elapsed time information from the predetermined starting point timing as estimation information related to the number of updated cameras.

Figure 10:
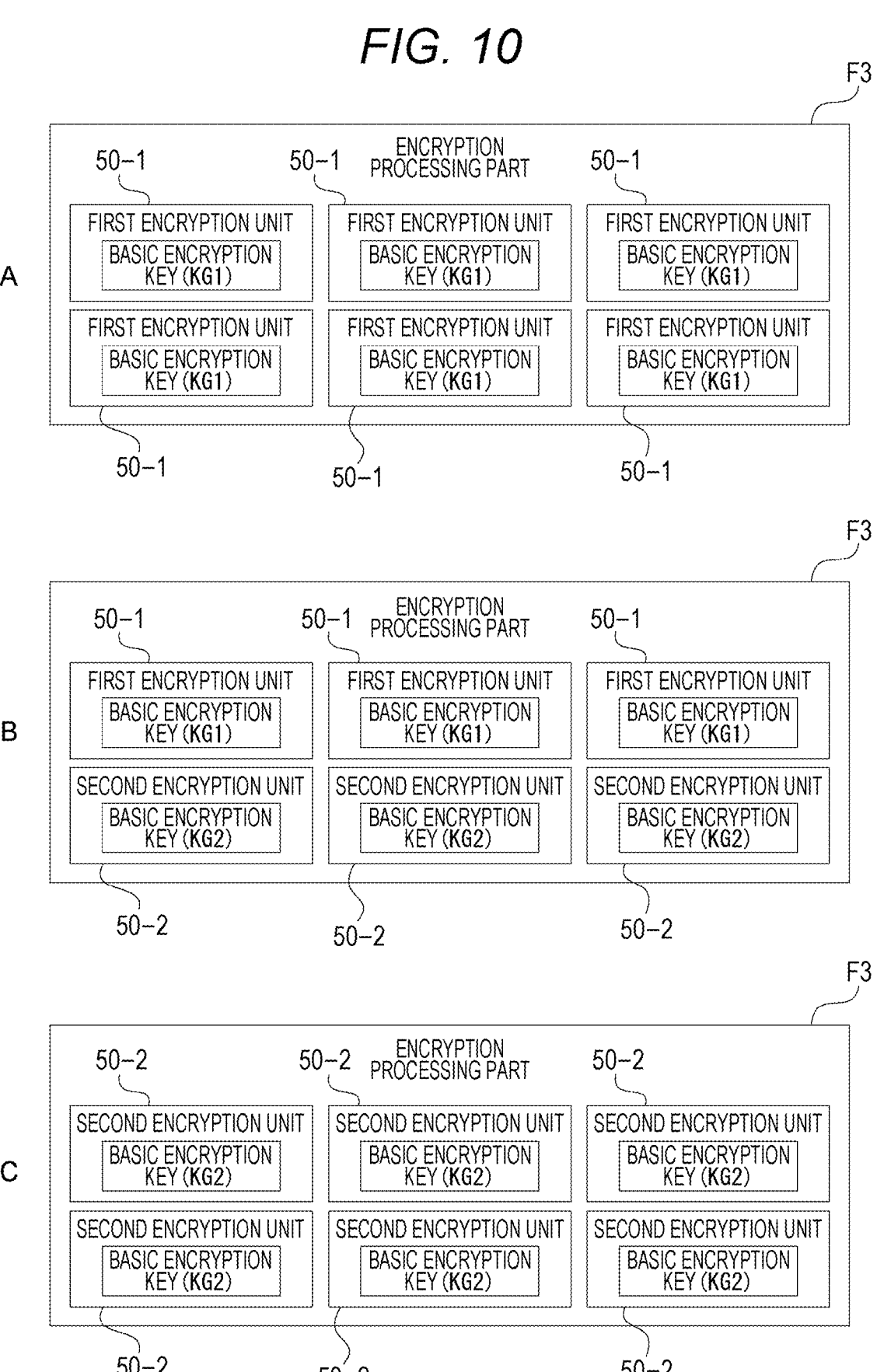
FIG. 10 is an explanatory diagram of a specific example of rolling update processing.

FIG. 10 is an explanatory diagram of a specific example of the rolling update processing.

Through the transitions in FIGS. 10A, 10B, and 10C, temporal changes in the number of the first encryption units 50-1 and the number of the second encryption units 50-2 included in the encryption processing part F3 are illustrated. In this example, the total number (total number) of the encryption units 50 included in the encryption processing part F3 is 6 and is invariable.

FIG. 10A illustrates a state in an initial stage as a stage before the predetermined starting point timing described above arrives, and in this initial stage, all the encryption units 50 are set as the first encryption unit 50-1 as illustrated in the drawing.

Thereafter, the encryption key is updated, and the second encryption unit 50-2 is included as the encryption unit 50 as illustrated in FIG. 10B in a first stage from the predetermined starting point timing until a certain period elapses. Specifically, in the illustrated example, the number of the first encryption units 50-1 and the number of the second encryption units 50-2 are the same (three for each).

In a second stage after a certain time has elapsed from the end of the first stage, as illustrated in FIG. 10C, the number of the first encryption units 50-1 is reduced from the first stage. Specifically, in the example of this figure, all the encryption units 50 are set as the second encryption unit 50-2.

Note that the number of stages for the rolling update is not limited to two as described above, and can be set to three or more. The rolling update in this case may be performed such that the number of first encryption units 50-1 decreases as the stage progresses.

The above description has illustrated the example where the total number of the encryption units 50 is invariable at the time of the rolling update. However, a rolling update in which the total number of the encryption units 50 is variable can also be performed.

For example, on a similar assumption that the number of the first encryption units 50-1 is 6 and the number of the second encryption units 50-2 is 0 in the encryption unit 50 at the initial stage, such an example is conceivable where the number of the first encryption units 50-1 is 6 and the number of the second encryption units 50-2 is 6 in the first stage, and the number of the first encryption units 50-1 is 0 and the number of the second encryption units 50-2 is 6 in the second stage.

Note that, the above description has illustrated the example where the elapsed time information from the predetermined starting point timing is used as the "estimation information related to the number of updated cameras" used for the rolling update processing. However, as the estimation information, for example, it is conceivable to use count information on the assumption that the number of updated cameras is actually counted on the customer side or the like, and the estimation information is not limited to the elapsed time information from the predetermined starting point timing.

In addition, in the present embodiment, the encryption processing part F3 performs load balancing processing (load distribution processing) for each of the first encryption unit 50-1 and the second encryption unit 50-2 in accordance with the fact that the plurality of first encryption units 50-1 and the plurality of second encryption units 50-2 can perform the encryption processing in parallel. In other words, allocation control of the encryption unit 50 that performs encryption processing is performed such that the processing load is distributed among the plurality of first encryption units 50-1 and the plurality of second encryption units 50-2 in response to the encryption request for the AI software specifying the key generation information from the customer side.

For the purpose of confirmation, note that in the present example, the chip ID used for the encryption key and the decryption key is a unique ID for each individual camera 3, and the AI software needs to be encrypted for each camera 3, as described above. That is, from this point, a situation may arise where the first encryption unit 50-1 and the second encryption unit 50-2 including the same basic encryption key perform encryption processing in parallel.

Figure 11:
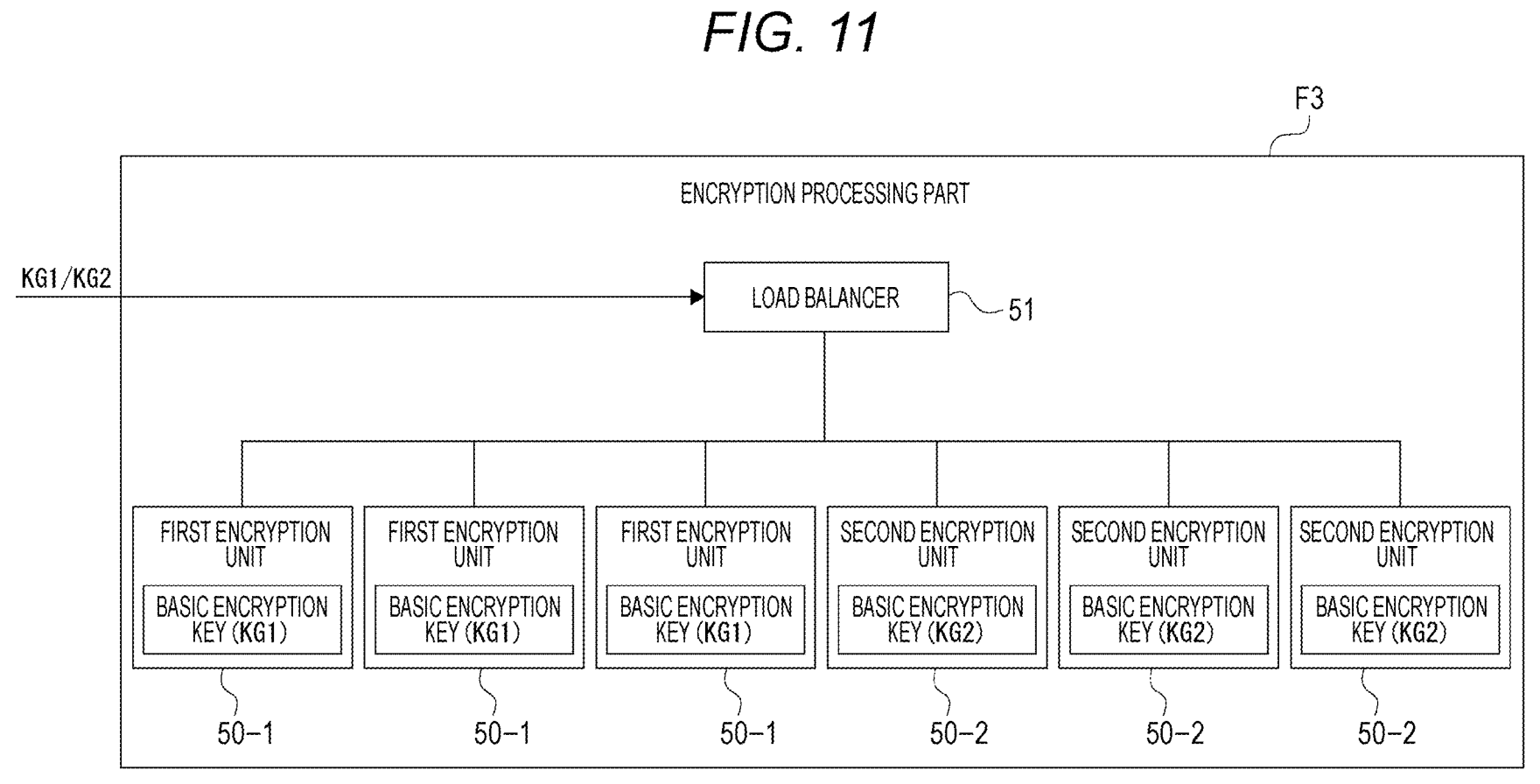

As one specific method of load balancing, a method using a load balancer 51 as illustrated in FIG. 11 can be exemplified.

In the encryption processing part F3 in this case, in response to an encryption request made from the customer side specifying one of KG1 and KG2, the load balancer 51 performs processing of selecting the encryption unit 50 that executes the encryption processing corresponding to the request for each of the plurality of first encryption units 50-1 and the plurality of second encryption units 50-2.

That is, in response to the encryption request specifying KG1 in accordance with the key generation information, processing is performed to select the first encryption unit 50-1 that executes the encryption processing for the AI software corresponding to the encryption request from the plurality of first encryption units 50-1. In addition, in response to the encryption request specifying KG2, processing is performed to select the second encryption unit 50-2 that executes the encryption processing for the AI software corresponding to the encryption request from the plurality of second encryption units 50-2.

As a method of selecting the encryption unit 50 for processing load distribution, for example, it is conceivable to perform selection by a round-robin method. That is, the encryption unit 50 that executes the encryption processing corresponding to the request is cyclically selected in a predetermined order.

Alternatively, the selection of the encryption unit 50 for processing load balancing can be performed on the basis of the resource usage rate of the encryption unit 50.

For the purpose of confirmation, note that each container is allocated an available hardware resource, so that each container can be regarded as virtually independent hardware. Therefore, the load balancing of the encryption processing is performed for each container (i.e., first encryption unit 50-1 and second encryption unit 50-2) so that the load between the containers is appropriately distributed on the basis of each resource usage rate (resource usage rate with respect to the hardware resources that can be occupied).

For example, it is conceivable to adopt a method of preferentially allocating encryption processing to the encryption unit 50 with a low resource usage rate, such as allocating encryption processing to the encryption unit 50 with the lowest resource usage rate.

Figure 12:
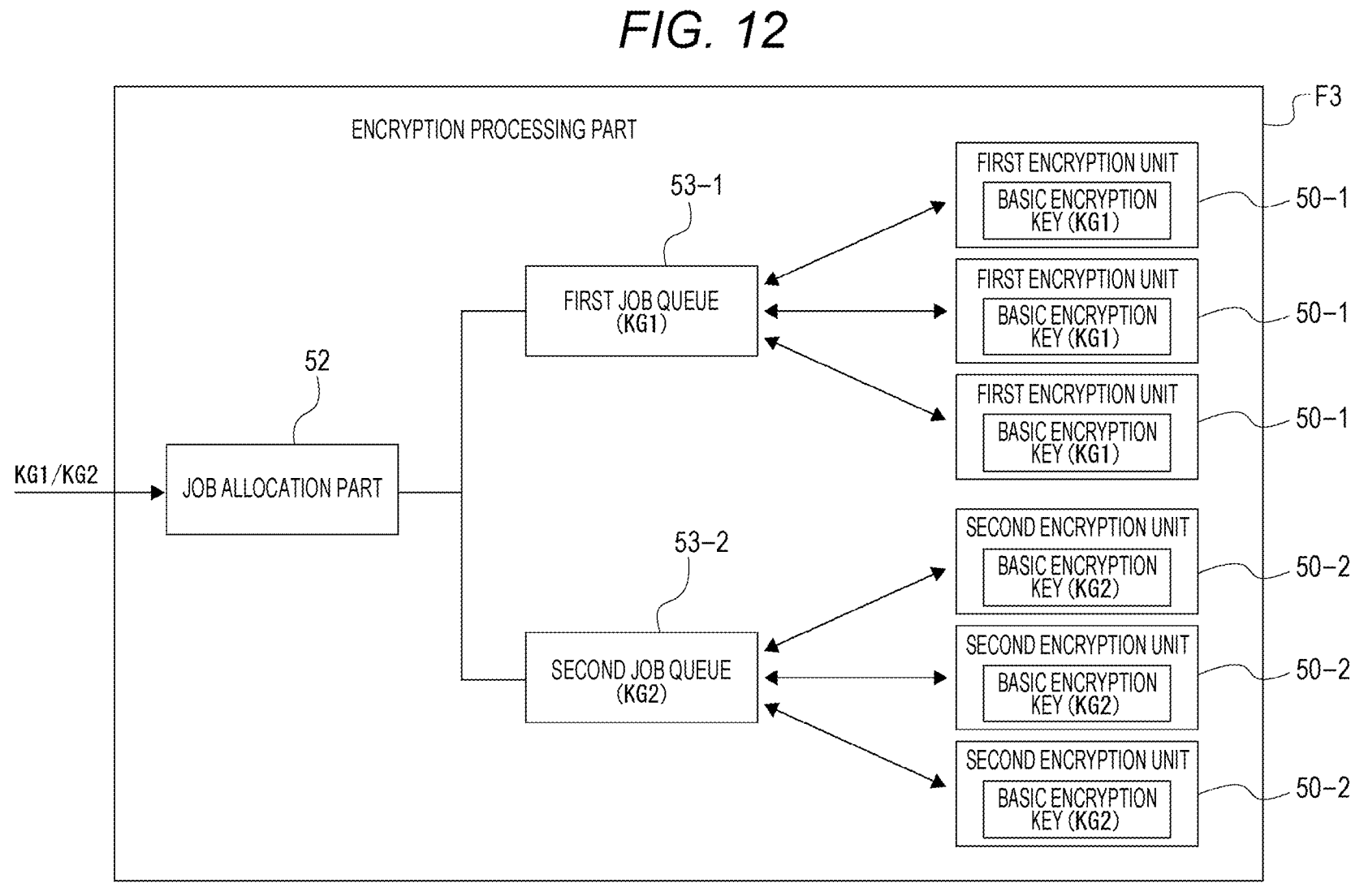

Furthermore, for the load balancing processing, in addition to the method using the load balancer 51 as illustrated in FIG. 11, a method using job queues as illustrated in FIG. 12 can be adopted.

As illustrated in FIG. 12, the encryption processing part F3 in this case is provided with a plurality of first encryption units 50-1 and a plurality of second encryption units 50-2, a job allocation part 52, a first job queue 53-1 for storing a job that requires encryption processing using an original-generation (KG1) encryption key, and a second job queue 53-2 for storing a job that requires encryption processing using a new-generation (KG2) encryption key.

In this case, each of the first encryption units 50-1 acquires and executes a job stored in the first job queue 53-1, and each of the second encryption units 50-2 acquires and executes a job stored in the second job queue 53-2.

For the encryption requests from the customer side, the job allocation part 52 stores a job corresponding to the request specifying KG1 in the first job queue 53-1, and stores a job corresponding to the request specifying KG2 in the second job queue 53-2.

Such a method using job queues also enables the distribution of the processing load for each of the plurality of first encryption units 50-1 and the plurality of second encryption units 50-2.

Note that, even in the case of adopting the load distribution method using job queues as described above, the rolling update processing can be performed by a method similar to that described above.

Here, in the management server 1, it is not desirable from a security perspective that a state where encryption using the original-generation encryption key is possible is inadvertently continued.

Therefore, the management server 1 performs processing of invalidating the original-generation encryption key in response to satisfaction of a predetermined condition. In this context, the phrase "invalidating the encryption key" means a state where encryption using the encryption key becomes impossible. Specifically, in a case where processing of deleting the corresponding encryption key from the memory is performed, or a configuration of performing encryption by the encryption unit 50 that includes the encryption key as illustrated above is adopted, the processing is achieved as processing of deleting the encryption unit 50 that includes the corresponding encryption key.

Note that, in a case where the management server 1 holds an original-generation encryption key other than the original-generation encryption key included in the first encryption unit 50-1, the invalidation processing includes processing of deleting that encryption key. Specifically, in the present example using the basic encryption key, in a case where the original-generation basic encryption key is held in addition to the original-generation basic encryption key included in the first encryption unit 50-1, processing of deleting the original-generation basic encryption key is included.

In the management server 1, it is conceivable that the invalidation processing for the original-generation encryption key (pre-update encryption key) is performed in response to input of predetermined information such as various types of notification information, operation input information, and the like. For example, it is conceivable to perform the invalidation processing for the original-generation encryption key in accordance with notification information for notifying satisfaction of a predetermined condition, such as the completion of the update of the customer keys for all the cameras 3 used by the customer, operation input information for an invalidation execution instruction performed in response to satisfaction of the predetermined condition, and the like.

Alternatively, it is also conceivable that the invalidation processing for the original-generation encryption key is performed on the basis of elapsed time information from a predetermined starting point timing. Specifically, for example, it is conceivable to perform the invalidation processing for the original-generation encryption key on the condition that an elapsed time from a predetermined starting point timing such as a timing at which key leakage is found or a timing at which it is estimated that the update of the customer key is started reaches a certain time.

3. Processing Procedure

Subsequently, a specific processing procedure example for achieving the encryption-related processing as the embodiment described above will be described with reference to each of the flowcharts of FIGS. 13 to 15.

Figure 15:
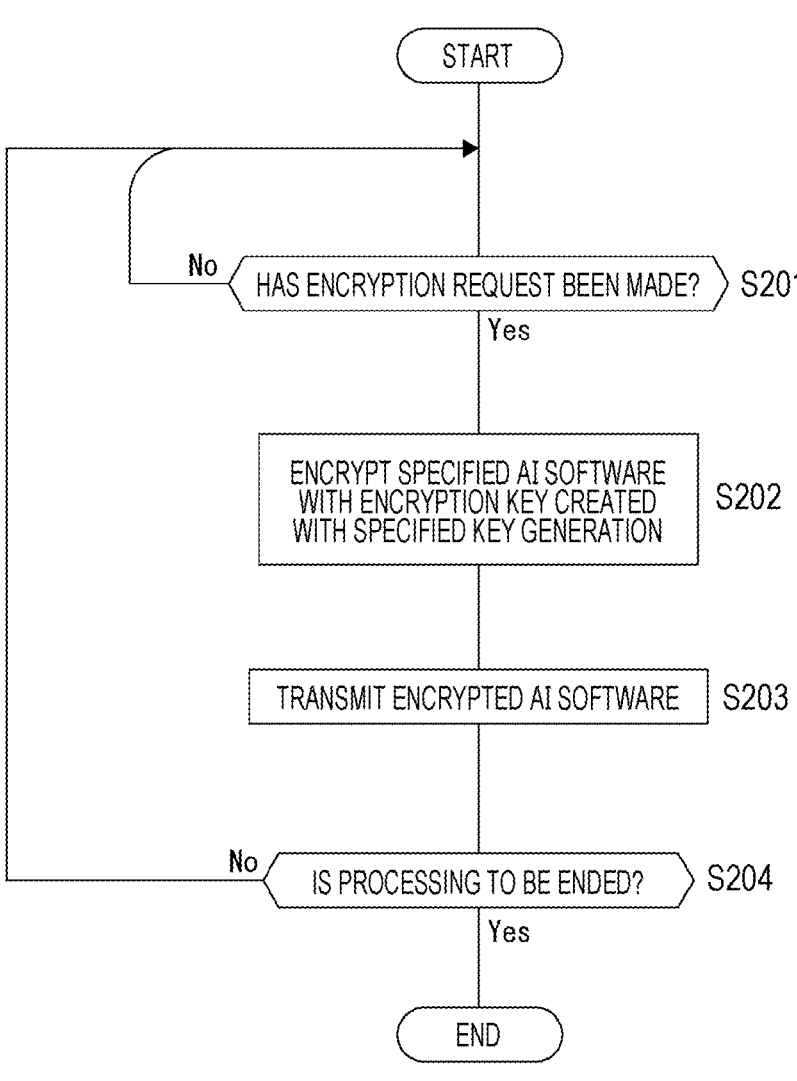
FIG. 15 is a flowchart of processing related to encryption and transmission of AI software in the embodiment.

Note that the processing illustrated in each of FIGS. 13 to 15 is executed by the CPU 11 of the management server 1 on the basis of a program stored in, for example, the ROM 12, the non-volatile memory part 14, or the like.

FIG. 13 is a flowchart of processing related to an update of an encryption key.

First, in step S101, the CPU 11 waits for an instruction to create a new-generation encryption key from the customer side, and in a case where an instruction is issued to create a new-generation encryption key, the CPU 11 proceeds to step S102 and creates a new-generation encryption key on the basis of the specified customer information and key generation information. In the case of the present example using the basic encryption key as described above, a new basic encryption key based on the master key, the customer management key, and the key generation information is created on the basis of at least the customer ID and the key generation information (the key generation information indicating the new generation) specified in the creation instruction from the customer side. In a case where the encryption key is individually created for each customer camera 3, a new encryption key based on the master key, the chip ID, the customer management key, and the key generation information is created on the basis of the customer ID, the chip ID, and the key generation information specified in the creation instruction from the customer side (cf. <10> in FIG. 7A).

In step S103 following step S102, the CPU 11 performs processing of storing the encryption key created in step S102 in a predetermined storage apparatus such as the non-volatile memory part 14 as storage processing for the created encryption key, and ends the series of processing illustrated in FIG. 13.

FIG. 14 is a flowchart of processing related to the invalidation of the original-generation encryption key.

As illustrated in the drawing, the CPU 11 waits for the invalidation condition of the original-generation encryption key to be satisfied in step S110. In a case where the invalidation condition is satisfied, the CPU executes the invalidation processing for the original-generation encryption key in step S111, and ends the series of processing illustrated in FIG. 14.

As understood from the above description, examples of the invalidation condition of the original-generation encryption key include that predetermined information is input or that an elapsed time from a predetermined starting point timing reaches a certain time.

Specific timing for executing the invalidation processing is, for example, as follows:

Timing when the customer key update has been completed for all the cameras 3 used by the customer Timing when the execution of encryption using the new-generation encryption key has been confirmed for all the cameras 3 used by the customer Timing when a certain time has elapsed since the request to update the encryption key was made Timing when advance notice is provided to the customer (date and time of advance notice), etc.

Note that it is not necessary to perform the rolling update or the load balancing processing for each of the first encryption unit 50-1 and the second encryption unit 50-2 as described above, but it is also conceivable to perform the invalidation processing on the condition that key leakage has been found.

Alternatively, in a case where the new-generation customer key is created in the management server 1 and transmitted to the customer, it is also conceivable to perform the invalidation processing for the original-generation encryption key on the condition that the transmission of the new-generation customer key to the target customer is completed.

FIG. 15 is a flowchart of processing related to encryption and transmission of AI software.

In step S201, the CPU 11 waits for an encryption request from the customer side, and in a case where the encryption request has been made, proceeds to step S202, and encrypts the specified AI software with the encryption key created the specified key generation. That is, in the case of the present example using the first encryption unit 50-1 and the second encryption unit 50-2 each including the basic encryption key, the AI software specified by the software ID of the encryption request is encrypted using, out of the first encryption unit 50-1 and the second encryption unit 50-2, the encryption unit 50 including the basic encryption key of the generation corresponding to the key generation information included in the encryption. At this time, the encryption unit 50 encrypts the target AI software with an encryption key created by multiplying the basic encryption key by the chip ID included in the encryption request.

Note that, in a case where the original-generation encryption key and the new-generation encryption key are created and held for each camera 3, processing of encrypting the AI software specified by the software ID of the encryption request with the encryption key specified by the key generation information and the chip ID included in the encryption request is performed.

In step S203 following step S202, the CPU 11 performs processing of transmitting the encrypted AI software. That is, in the present example, processing of transmitting the encrypted AI software to the customer server 2 that has made the encryption request is performed.

In step S204 following step S203, the CPU 11 determines whether or not the processing is to be ended, that is, whether or not a predetermined condition (hereinafter referred to as a "processing end condition") in which the series of processing illustrated in FIG. 15 is to be ended has been satisfied.

In a case where it is determined that the processing end condition has not been satisfied and the processing is not to be ended, the CPU 11 returns to step S201.

On the other hand, in a case where it is determined that the processing end condition has been satisfied and the processing is to be ended, the CPU 11 ends the series of processing illustrated in FIG. 15.

Here, in a case where the rolling update and the load balancing described above are performed, the CPU 11 performs the following processing.

Specifically, for the rolling update, for example, as described above with reference to FIG. 10, the number of first encryption units 50-1 that perform encryption using the original-generation encryption key and the number of second encryption units 50-2 that perform encryption using the new-generation encryption key are adjusted in accordance with the elapsed time from the predetermined starting point timing.

Furthermore, regarding the load balancing, as described above with reference to FIG. 11, the encryption processing is allocated to each of the plurality of first encryption units 50-1 and second encryption units 50-2 on the basis of the round-robin method or the resource usage rate of each unit.

Alternatively, in the method using job queues as described with reference to FIG. 12, the corresponding job (the encryption processing for the AI software) is stored in the first job queue 53-1 in response to the reception of the encryption request specifying the original generation, and the corresponding job is stored in the second job queue 53-2 in response to the reception of the encryption request specifying the new generation.

Here, in a case where the method using the load balancer 51 as illustrated in FIG. 11 is adopted, it is not desirable to wait for the encryption corresponding to the encryption request or the transmission of the encrypted AI software and then accept the next encryption request as in the processing illustrated in FIG. 15. However, it is desirable to accept the next encryption request without waiting for the encryption corresponding to the encryption request or the transmission of the encrypted AI software.

On the other hand, in the method using job queues as illustrated in FIG. 12, the following may be performed: to wait for the encryption corresponding to the encryption request or the transmission of the encrypted AI software and then accept the next encryption request as in the processing illustrated in FIG. 15; or to accept the next encryption request without waiting for the encryption corresponding to the encryption request or the transmission of the encrypted AI software.

4. Modifications

Note that the embodiment is not limited to the specific examples described above, and configurations as various modifications can be adopted.

For example, the above description has illustrated the example where the AI software is encrypted using the encryption processing part including the encryption key as the encryption unit 50. However, for example, a configuration in which encryption processing using a key storage part 54 is performed as illustrated in FIG. 16 can also be adopted.

Figure 16:
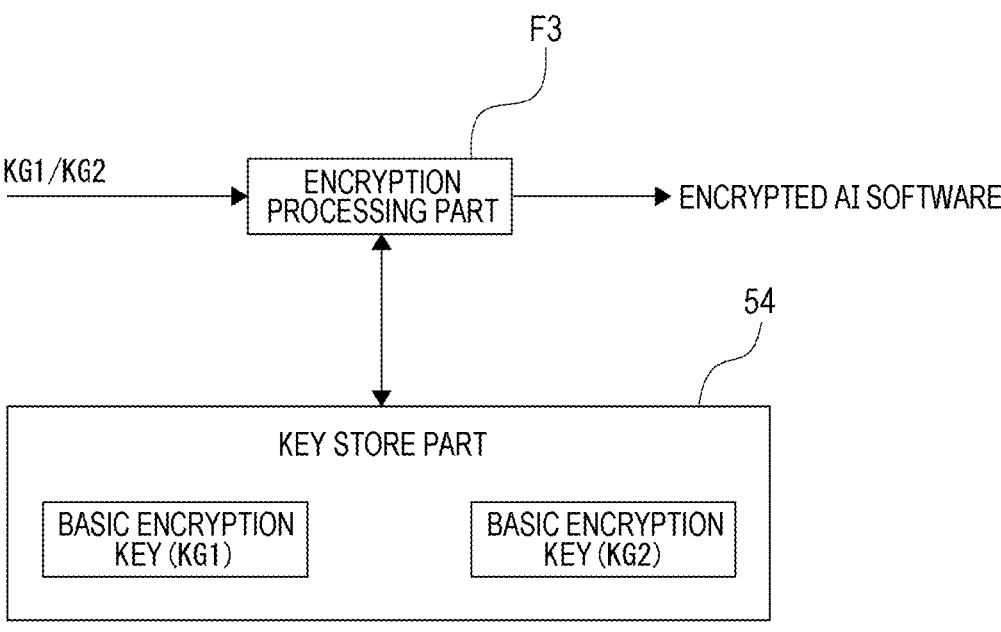
FIG. 16 is an explanatory diagram of encryption processing as a modification.

In FIG. 16, the key storage part 54 is a storage device for key information provided as, for example, a hardware security module (HSM), a key management service (KMS), or the like, and in the present modification, an original-generation basic encryption key (in the drawing, the basic encryption key (KG1)) and a new-generation basic encryption key (in the drawing, the basic encryption key (KG2)) are stored.

In this case, in the encryption processing part F3 can selectively read the original-generation encryption key and the new-generation encryption key from the key storage part 54, and reads the original-generation encryption key from the key storage part 54 to encrypt the AI software in a case where the key generation information indicates the original generation in response to the encryption request in which the key generation is specified by the key generation information, and reads the new-generation encryption key from the key storage part 54 to encrypt the AI software in a case where the key generation information indicates the new generation.

Specifically, in a case where the encryption request indicates the original generation, the encryption processing part F3 reads the original-generation basic encryption key from the key storage part 54, and encrypts the AI software specified by the software ID of the encryption request with the encryption key created by multiplying the read basic encryption key by the chip ID specified by the encryption request. In addition, in a case where the encryption request indicates the new generation, the new-generation basic encryption key is read from the key storage part 54, and the AI software specified by the software ID of the encryption request is encrypted with the encryption key created by multiplying the read basic encryption key by the chip ID specified by the encryption request.

According to the configuration as the modification as described above, since the key storage part to which relatively strong security measures are applied can be used as the key storage part 54, it is possible to reduce the risk of encryption key leakage and to improve security.

Note that, in this case as well, the encryption processing part F3 may be provided with a plurality of units that perform the encryption processing for the AI software (however, the units do not include a basic encryption key unlike the encryption unit 50), enabling the encryption processing to be performed in parallel. Each unit in this case executes processing of acquiring an encryption key of a generation specified by the encryption request from the key storage part 54 and encrypting the specified AI software.

In a case where a plurality of units is provided as described above, it is also possible to perform load distribution processing on the plurality of units. Specifically, the load distribution processing is load distribution processing by the method using a load balancer or the method using job queues as described above, or other methods.

Furthermore, the above description has illustrated the example where the encryption key using the master key, the chip ID, the customer management key, and the key generation information is created as the encryption key used for encrypting the AI software. However, sensor type information capable of identifying the type (e.g., model) of the image sensor 30 together with the master key, the customer management key, and the key generation information may be used as the encryption key.

Furthermore, the above description has illustrated the configuration in which the image recognition processing using the AI model is performed within the image sensor 30, but the image recognition processing may be performed outside the image sensor 30.

Furthermore, the above description has illustrated the case where the camera 3 is configured to obtain a color image as a captured image, but in the present specification, "imaging" broadly means obtaining image data capturing a subject. In this context, the term "image data" refers to a generic term for data including a plurality of pieces of pixel data, and the pixel data is a concept broadly including not only data indicating the intensity of the light reception amount from the subject but also data indicating, for example, the distance to the subject, polarization information, and temperature information. That is, the "image data" obtained by "imaging" includes data as a gradation image indicating information of the intensity of the light reception amount for each pixel, data as a distance image indicating information of the distance to the subject for each pixel, data as a polarization image indicating polarization information for each pixel, data as a thermal image indicating temperature information for each pixel, and the like.

5. Summary of Embodiment

As described above, the information processing apparatus (management server 1) as an embodiment includes an encryption key creation part (encryption key creation processing part F2) that creates an encryption key on the basis of a first type key (master key) stored in advance in an imaging apparatus (camera 3), a second type key (customer management key) different from the first type key, and a third type key (key generation information) that is different from the first type key and the second type key and is a key (customer key) multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, the encryption key creation part creating, in response to specification of a key derived from new information different from original information as the third type key, a new encryption key based on the third type key derived from the new information, the first type key, and the second type key on the basis of the new information.

With the above configuration, in the case of adopting a system operation mode in which there is a system administrator, who manages the entire camera system using the imaging apparatus, and a customer, who acts as a user of the camera system, the system administrator side encrypts AI software, and the customer side acquires the encrypted AI software from the system administrator side and transmits the acquired AI software to the imaging apparatus, the update of the encryption key for the AI software can be easily achieved by the customer side simply instructing the update of the third type key.

Therefore, for example, it is possible to reduce labor related to the update of the encryption key in response to an encryption request for the AI software specifying the third type key, the encryption key leakage or the like.

For example, when it is attempted to update the second type key without using the third type key, it is necessary to re-register the second type key on the system administrator side. However, as in the embodiment, the encryption key is a key based on the first type key, the second type key, and the third type key, and the encryption key is updated using the new third type key in response to specification of a new third type key. Therefore, when the customer is caused to specify a new second type key, it is possible to update the encryption key in the management server and to eliminate the need to re-register the second type key on the system administrator side.

Furthermore, in the information processing apparatus as an embodiment, the third type key is information indicating a generation of the encryption key.

As a result, the customer side can update the encryption key for the AI software to the new-generation encryption key by instructing the system administrator side of the third type key indicating the new generation.

Therefore, for example, it is possible to reduce labor related to the update of the encryption key in response to an encryption request for the AI software specifying the third type key, the encryption key leakage or the like.

Moreover, in the information processing apparatus as an embodiment, the first type key is a key stored in the imaging apparatus as a hardware key.

Since the first type key is the hardware key stored in the imaging apparatus, the AI software can be decrypted only by the imaging apparatus as an authorized product (authenticated product).

Therefore, security can be improved.

Furthermore, the information processing apparatus as an embodiment further includes an encryption processing part (encryption processing part F3) that encrypts the AI software by using an encryption key created by the encryption key creation part. The encryption processing part performs rolling update processing of adjusting the number of first encryption units (first encryption units 50-1) and the number of second encryption units (second encryption units 50-2) on the basis of estimation information related to the number of updated imaging apparatuses, each being the imaging apparatus in which the third type key has been updated or the combination key of the second type key and the third type key has been updated, the first encryption units each being a first encryption unit that includes a pre-update encryption key as the encryption key created on the basis of the third type key derived from the original information and encrypts the AI software with the pre-update encryption key, the second encryption units each being a second encryption unit that includes a post-update encryption key as the new encryption key created on the basis of the third type key derived from the new information and encrypts the AI software with the post-update encryption key.

As a result, corresponding to a case where the updated imaging apparatus in which the key used for decryption is updated and the non-updated imaging apparatus in which the key is not updated coexist, and the encryption request for the AI software to be used by the updated imaging apparatus (the encryption request specifying the encryption by the post-update encryption key) and the encryption request for the AI software to be used by the non-updated imaging apparatus (the encryption request specifying the encryption by the pre-update encryption key) coexist and are made to the information processing apparatus, the number of the first encryption units and the number of second encryption units can be appropriately adjusted according to the number of the imaging apparatuses in which the key is updated, for example, by making the number of the first encryption unit larger than the number of the second encryption units in a state where the number of the updated imaging apparatuses is still small, and making the number of the second encryption units larger than the number of the first encryption units in a state where the number of the updated imaging apparatuses has increased.

Therefore, in accordance with a situation where the key update for the plurality of imaging apparatuses gradually progresses, the encryption processing using the pre-update and post-update encryption keys can be performed by efficiently using limited hardware resources.

Furthermore, in the information processing apparatus as an embodiment, the estimation information is elapsed time information from a predetermined starting point timing, and the encryption processing part adjusts the number of the first encryption units and the number of the second encryption units on the basis of the elapsed time information.

As a result, it is possible to adjust the number of the first encryption units and the number of the second encryption units on the basis of an elapsed time from a timing at which it is estimated that the key update of the imaging apparatus is started, such as a timing at which an encryption key update instruction (specification of a new third type key) is issued from the customer side.

Therefore, in accordance with a situation where the key update for the plurality of imaging apparatuses gradually progresses, the encryption processing using the pre-update and post-update encryption keys can be performed by efficiently using limited hardware resources.

Moreover, in the information processing apparatus as an embodiment, the encryption processing part performs the rolling update processing in which a total number of encryption units, including the first encryption unit and the second encryption unit, is made invariable.

The rolling update processing in which the total number of encryption units is made invariable is suitable in a case where the number of encryption requests performed on the customer side at a time is a fixed number.

Furthermore, in the information processing apparatus as an embodiment, the encryption processing part performs the rolling update processing in which a total number of encryption units, including the first encryption unit and the second encryption unit, is made variable.

As a result, it is possible to achieve an appropriate rolling update corresponding to a case where the number of encryption requests from the customer side changes depending on the situation, for example, the number of encryption requests is large immediately after the customer side instructs the update of the encryption key, and the number of encryption requests decreases with the lapse of time thereafter.

Furthermore, the information processing apparatus as an embodiment further includes an encryption processing part that encrypts the AI software by using an encryption key created by the encryption key creation part. The encryption processing part includes a plurality of first encryption unit each including a pre-update encryption key as the encryption key created on the basis of the third type key derived from the original information and encrypts the AI software with the pre-update encryption key, and a plurality of second encryption units each including a post-update encryption key as the new encryption key created on the basis of the third type key derived from the new information and encrypts the AI software with the post-update encryption key, and the encryption processing part performs allocation control for encryption units that perform encryption processing such that a processing load is distributed among the plurality of the first encryption units and the plurality of the second encryption units in response to an encryption request for the AI software specifying the third type key.

As a result, the processing load related to the encryption of the AI software is distributed to each of the first encryption unit and the second encryption unit, corresponding to a case where a plurality of first encryption units and a plurality of second encryption units are provided to cope with a situation where the updated imaging apparatus and the non-updated imaging apparatus coexist.

Therefore, in a situation where the updated imaging apparatus and the non-updated imaging apparatus coexist, it is possible to improve the efficiency of the encryption processing in creation of appropriate encrypted AI software corresponding to each of the updated imaging apparatus and the non-updated imaging apparatus.

Moreover, in the information processing apparatus as an embodiment, the encryption processing part performs the allocation control such that distribution is performed by a round-robin method as the distribution of the processing load.

By the round-robin method, appropriate processing load distribution is performed.

Furthermore, in the information processing apparatus as an embodiment, the encryption processing part performs the allocation control such that distribution corresponding to the resource usage rates of the first encryption unit and the second encryption unit is performed as the distribution of the processing load.

As a result, appropriate load distribution corresponding to the resource usage rate can be achieved, for example, by preferentially allocating encryption processing to an encryption unit with a low resource usage rate.

Furthermore, the information processing apparatus as an embodiment further including an encryption processing part that encrypts the AI software by using an encryption key created by the encryption key creation part. The encryption processing part is able to read a pre-update encryption key and a post-update encryption key from a key storage part that stores the post-update encryption key and the pre-update encryption key, the pre-update encryption key being an encryption key created on the basis of the third type key derived from the original information, the post-update encryption key being a new encryption key created on the basis of the third type key derived from the new information, and in response to an encryption request for the AI software specifying the third type key, the encryption processing part reads the pre-update encryption key from the key storage part to encrypt the AI software in a case where the third type key indicates the original information, and reads the post-update encryption key from the key storage part to encrypt the AI software in a case where the third type key indicates the new information.

With the above configuration, it is possible to use a key storage part to which a relatively strong security measure such as HSM is applied and to reduce the risk of encryption key leakage.

Therefore, security can be improved.

Moreover, in the information processing apparatus as an embodiment, processing is performed to invalidate a pre-update encryption key that is the encryption key created on the basis of the third type key derived from the original information.

By performing the invalidation processing for the pre-update encryption key, for example, it is possible to prevent a state where the AI software can be encrypted with the pre-update encryption key from being inadvertently maintained after a new encryption key is created in response to key leakage or the like.

Therefore, security can be improved.

Furthermore, in the information processing apparatus as an embodiment, processing is performed to invalidate the pre-update encryption key in response to input of predetermined information.

As a result, the invalidation processing for the pre-update encryption key is performed in response to the input of predetermined information such as various types of notification information and operation input information.

Therefore, it is possible to invalidate the pre-update encryption key at an appropriate timing corresponding to an encryption request for the AI software specifying the third type key, various conditions, such as performing the invalidation processing for the pre-update encryption key in accordance with notification information for notifying satisfaction of a predetermined condition, such as a key leakage or the completion of the update of key information in all target imaging apparatuses, operation input information for an invalidation execution instruction performed in response to the satisfaction of the predetermined condition, and the like.

Furthermore, in the information processing apparatus as an embodiment, processing is performed to invalidate the pre-update encryption key on the basis of elapsed time information from a predetermined starting point timing.

As a result, it is possible to perform the invalidation processing for the pre-update encryption key on the basis of the elapsed time from the predetermined starting point timing, for example, the timing at which key leakage is found.

Therefore, it is possible to invalidate the pre-update encryption key at an appropriate timing corresponding to the elapsed time from the starting point timing, for example, by performing invalidation processing for the pre-update encryption key in response to the lapse of a certain time from the starting point timing.

Moreover, the information processing apparatus as an embodiment further includes: an encryption processing part that encrypts the AI software by using an encryption key created by the encryption key creation part; and a transmission processing part (transmission processing part F4) that performs processing of transmitting the AI software, encrypted by the encryption processing part, to an external apparatus.

This enables the transmission of the encrypted AI software to an external apparatus such as a server managed on the customer side.

Furthermore, the information processing method as an embodiment is an information processing method for creating an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, the method creating, in response to specification of a key derived from new information different from original information as the third type key, a new encryption key based on the third type key derived from the new information, the first type key, and the second type key on the basis of the new information.

Such an information processing method can also bring actions and effects similar to those of the information processing apparatus as the embodiment described above.

Here, as an embodiment, it is conceivable to use a program that causes, for example, a CPU, a digital signal processor (DSP), or the like, or a device including these components, to execute the processing by the encryption key creation processing part F2, the encryption processing part F3, the transmission processing part F4, and the like described in FIGS. 13 to 15 and the like.

That is the program of the embodiment is a program that causes a computer apparatus to implement a function of creating an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, and creating, in response to specification of a key derived from new information different from original information as the third type key, a new encryption key based on the third type key derived from the new information, the first type key, and the second type key on the basis of the new information.

With such a program, the function as the encryption key creation processing part F2 described above can be achieved in an apparatus as the information processing apparatus 10 or the like.

The program described above can be recorded in advance in an HDD as a recording medium built in an apparatus such as a computer apparatus, a ROM in a microcomputer having a CPU, or the like.

Alternatively, the program can be temporarily or permanently stored (recorded) in a removable recording medium such as a flexible disk, a compact disc read-only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program may be installed from the removable recording medium into a personal computer or the like, or may be downloaded from a download site via a network such as a local area network (LAN) or the Internet.

In addition, such a program is suitable for providing the encryption key creation processing part F2 according to the embodiment in a wide range. For example, by downloading the program to a personal computer, a portable information processing apparatus, a mobile phone, a game apparatus, a video apparatus, a personal digital assistant (PDA), or the like, the personal computer or the like can be caused to function as an apparatus that achieves processing as the encryption key creation processing part F2 of the present disclosure.

Note that, the effects described in the present specification are merely examples and are not limited, and other effects may be provided.

6. Present Technology

The present technology can also adopt the following configurations.

(1)

An information processing apparatus including an encryption key creation part that creates an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, the encryption key creation part creating, in response to specification of a key derived from new information different from original information as the third type key, a new encryption key based on the third type key derived from the new information, the first type key, and the second type key on the basis of the new information.

(2)

The information processing apparatus according to (1) above, where the third type key is information indicating a generation of the encryption key.

(3)

The information processing apparatus according to (1) or (2) above, where the first type key is a key stored in the imaging apparatus as a hardware key.

(4)

The information processing apparatus according to any one of (1) to (3) above, further including an encryption processing part that encrypts the AI software by using an encryption key created by the encryption key creation part, where the encryption processing part performs rolling update processing of adjusting the number of first encryption units and the number of second encryption units on the basis of estimation information related to the number of updated imaging apparatuses, each being the imaging apparatus in which the third type key has been updated or the combination key of the second type key and the third type key has been updated, the first encryption units each being a first encryption unit that includes a pre-update encryption key as the encryption key created on the basis of the third type key derived from the original information and encrypts the AI software with the pre-update encryption key, the second encryption units each being a second encryption unit that includes a post-update encryption key as the new encryption key created on the basis of the third type key derived from the new information and encrypts the AI software with the post-update encryption key.

(5)

The information processing apparatus according to (4) above, where the estimation information is elapsed time information from a predetermined starting point timing, and the encryption processing part adjusts the number of the first encryption units and the number of the second encryption units on the basis of the elapsed time information.

(6)

The information processing apparatus according to (4) or (5) above, where the encryption processing part performs the rolling update processing in which a total number of encryption units, including the first encryption unit and the second encryption unit, is made invariable.

(7)

The information processing apparatus according to (4) or (5) above, where the encryption processing part performs the rolling update processing in which a total number of encryption units, including the first encryption unit and the second encryption unit, is made variable.

(8)

The information processing apparatus according to any one of (1) to (7) above, further including an encryption processing part that encrypts the AI software by using an encryption key created by the encryption key creation part, where the encryption processing part includes a plurality of first encryption unit each including a pre-update encryption key as the encryption key created on the basis of the third type key derived from the original information and encrypts the AI software with the pre-update encryption key, and a plurality of second encryption units each including a post-update encryption key as the new encryption key created on the basis of the third type key derived from the new information and encrypts the AI software with the post-update encryption key, and the encryption processing part performs allocation control for encryption units that perform encryption processing such that a processing load is distributed among the plurality of the first encryption units and the plurality of the second encryption units in response to an encryption request for the AI software specifying the third type key.

(9)

The information processing apparatus according to (8) above, where the encryption processing part performs the allocation control such that distribution is performed by a round-robin method as the distribution of the processing load.

(10)

The information processing apparatus according to (8) above, where the encryption processing part performs the allocation control such that distribution corresponding to resource usage rates of the first encryption unit and the second encryption unit is performed as the distribution of the processing load.

(11)

The information processing apparatus according to any one of (1) to (3) above, further including an encryption processing part that encrypts the AI software by using an encryption key created by the encryption key creation part, where the encryption processing part is able to read a pre-update encryption key and a post-update encryption key from a key storage part that stores the post-update encryption key and the pre-update encryption key, the pre-update encryption key being an encryption key created on the basis of the third type key derived from the original information, the post-update encryption key being a new encryption key created on the basis of the third type key derived from the new information, and in response to an encryption request for the AI software specifying the third type key, the encryption processing part reads the pre-update encryption key from the key storage part to encrypt the AI software in a case where the third type key indicates the original information, and reads the post-update encryption key from the key storage part to encrypt the AI software in a case where the third type key indicates the new information.

(12)

The information processing apparatus according to any one of (1) to (11) above, where processing is performed to invalidate a pre-update encryption key that is the encryption key created on the basis of the third type key derived from the original information.

(13)

The information processing apparatus according to (12) above, where processing is performed to invalidate the pre-update encryption key in response to input of predetermined information.

(14)

The information processing apparatus according to (12) above, where processing is performed to invalidate the pre-update encryption key on the basis of elapsed time information from a predetermined starting point timing.

(15)

The information processing apparatus according to any one of (1) to (14) above, further including:

an encryption processing part that encrypts the AI software by using an encryption key created by the encryption key creation part; and a transmission processing part that performs processing of transmitting the AI software, encrypted by the encryption processing part, to an external apparatus.

(16)

An information processing method for creating an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, the method creating, in response to specification of a key derived from new information different from original information as the third type key, a new encryption key based on the third type key derived from the new information, the first type key, and the second type key on the basis of the new information.

(17)

A recording medium on which a program readable by a computer apparatus is recorded, the program causing the computer apparatus to implement a function of creating an encryption key on the basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of AI software including at least software of an artificial intelligence model, the imaging apparatus performing image recognition processing using the artificial intelligence model on a captured image obtained by capturing an image of a subject, and creating, in response to specification of a key derived from new information different from original information as the third type key, a new encryption key based on the third type key derived from the new information, the first type key, and the second type key on the basis of the new information.

REFERENCE SIGNS LIST

100 Information processing system
1 Management server
2 Customer server
3 Camera
4 Network
F1 Registration processing part
F2 Encryption key creation processing part
F3 Encryption processing part
F4 Transmission processing part
10 Information processing apparatus
11 CPU
12 ROM
13 RAM
14 Non-volatile memory part
15 Input/output interface
16 Input part
17 Display part
18 Audio output part
19 Storage part
20 Communication part
21 Drive
22 Removable recording medium
23 Bus
30 Image sensor
31 Imaging optical system
32 Optical system driving part
33 Control part
34 Memory part
35 Communication part
36 Sensor part
37 Bus
41 Imaging part
42 Image signal processing part
43 In-sensor control part
43*m* Non-volatile memory part
44 Image recognition part
45 Memory part
46 Computer vision processing part
47 Communication interface
48 Bus
50 Encryption unit
50-1 First encryption unit
50-2 Second encryption unit
51 Load balancer
52 Job allocation part
53-1 First job queue
53-2 Second job queue
54 Key storage part

The invention claimed is:

1. An information processing apparatus comprising:
circuitry configured to
create an encryption key on a basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of artificial intelligence (AI) software including at least software of an artificial intelligence model, wherein the imaging apparatus performs image recognition processing using the artificial intelligence model on a captured image obtained by capturing an image of a subject, and the circuitry creates, in response to specification of a key derived from new information different from original information as the third type key, a new encryption key based on the third type key derived from the new information, the first type key, and the second type key on a basis of the new information, the new information including new key-generation information and the original information being original key-generation information.

2. The information processing apparatus according to claim 1, wherein the third type key is information indicating a generation of the encryption key.

3. The information processing apparatus according to claim 1, wherein the first type key is a key stored in the imaging apparatus as a hardware key.

4. The information processing apparatus according to claim 1, wherein the circuitry is further configured to:

encrypt the AI software by using the encryption key created by the circuitry, wherein the circuitry performs rolling update processing of adjusting the number of first encryption units and the number of second encryption units on a basis of estimation information related to the number of updated imaging apparatuses, each being the imaging apparatus in which the third type key has been updated or the combination key of the second type key and the third type key has been updated, the first encryption units each being a first encryption unit that includes a pre-update encryption key as the encryption key created on a basis of the third type key derived from the original information and encrypts the AI software with the pre-update encryption key, the second encryption units each being a second encryption unit that includes a post-update encryption key as the new encryption key created on a basis of the third type key derived from the new information and encrypts the AI software with the post-update encryption key.

5. The information processing apparatus according to claim 4, wherein the estimation information is elapsed time information from a predetermined starting point timing, and the circuitry adjusts the number of the first encryption units and the number of the second encryption units on a basis of the elapsed time information.

6. The information processing apparatus according to claim 4, wherein the circuitry performs the rolling update processing in which a total number of encryption units, including the first encryption unit and the second encryption unit, is made invariable.

7. The information processing apparatus according to claim 4, wherein the circuitry performs the rolling update processing in which a total number of encryption units, including the first encryption unit and the second encryption unit, is made variable.

8. The information processing apparatus according to claim 1, wherein the circuitry is further configured to:

encrypt the AI software by using an encryption key created by the circuitry, wherein the circuitry includes a plurality of first encryption unit each including a pre-update encryption key as the encryption key created on a basis of the third type key derived from the original information and encrypts the AI software with the pre-update encryption key, and a plurality of second encryption units each including a post-update encryption key as the new encryption key created on a basis of the third type key derived from the new information and encrypts the AI software with the post-update encryption key, and the circuitry performs allocation control for encryption units that perform encryption processing such that a processing load is distributed among the plurality of the first encryption units and the plurality of the second encryption units in response to an encryption request for the AI software specifying the third type key.

9. The information processing apparatus according to claim 8, wherein the circuitry performs the allocation control such that distribution is performed by a round-robin method as the distribution of the processing load.

10. The information processing apparatus according to claim 8, wherein the circuitry performs the allocation control such that distribution corresponding to resource usage rates of the first encryption unit and the second encryption unit is performed as the distribution of the processing load.

11. The information processing apparatus according to claim 1, wherein the circuitry is further configured to:

encrypt the AI software by using an encryption key created by the circuitry, wherein the circuitry is able to read a pre-update encryption key and a post-update encryption key from a key storage that stores the post-update encryption key and the pre-update encryption key, the pre-update encryption key being an encryption key created on a basis of the third type key derived from the original information, the post-update encryption key being a new encryption key created on a basis of the third type key derived from the new information, and in response to an encryption request for the AI software specifying the third type key, the circuitry reads the pre-update encryption key from the key storage to encrypt the AI software in a case where the third type key indicates the original information, and reads the post-update encryption key from the key storage to encrypt the AI software in a case where the third type key indicates the new information.

12. The information processing apparatus according to claim 1, wherein processing is performed to invalidate a pre-update encryption key that is the encryption key created on a basis of the third type key derived from the original information.

13. The information processing apparatus according to claim 12, wherein processing is performed to invalidate the pre-update encryption key in response to input of predetermined information.

14. The information processing apparatus according to claim 12, wherein processing is performed to invalidate the pre-update encryption key on a basis of elapsed time information from a predetermined starting point timing.

15. The information processing apparatus according to claim 1, wherein the circuitry is further configured to:

encrypt the AI software by using an encryption key created by the circuitry; and perform processing of transmitting the AI software after encryption to an external apparatus.

16. An information processing method comprising:

creating an encryption key on a basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of artificial intelligence (AI) software including at least software of an artificial intelligence model;

performing, by the imaging apparatus, image recognition processing using the artificial intelligence model on a captured image obtained by capturing an image of a subject; and creating, in response to specification of a key derived from new information different from original information as the third type key, a new encryption key based on the third type key derived from the new information, the first type key, and the second type key on a basis of the new information, the new information including new key-generation information and the original information being original key-generation information.

17. A non-transitory computer-readable recording medium storing stores computer-readable instructions that, when executed by a computer, cause the computer to perform a method comprising:

creating an encryption key on a basis of a first type key stored in advance in an imaging apparatus, a second type key different from the first type key, and a third type key that is different from the first type key and the second type key and is a key multiplied with the second type key to create a combination key stored in the imaging apparatus, or is a key stored in the imaging apparatus together with the second type key, as an encryption key used by the imaging apparatus for encryption of artificial intelligence (AI) software including at least software of an artificial intelligence model;

performing, by the imaging apparatus, image recognition processing using the artificial intelligence model on a captured image obtained by capturing an image of a subject; and creating, in response to specification of a key derived from new information different from original information as the third type key, a new encryption key based on the third type key derived from the new information, the first type key, and the second type key on a basis of the new information, the new information including new key-generation information and the original information being original key-generation information.

* * * * *